(12) United States Patent
Bello et al.

(10) Patent No.: US 10,280,722 B2
(45) Date of Patent: May 7, 2019

(54) SYSTEM AND METHOD FOR REAL-TIME MONITORING AND ESTIMATION OF INTELLIGENT WELL SYSTEM PRODUCTION PERFORMANCE

(71) Applicants: Oladele Bello, Katy, TX (US); Stanley T. Denney, The Woodlands, TX (US)

(72) Inventors: Oladele Bello, Katy, TX (US); Stanley T. Denney, The Woodlands, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 960 days.

(21) Appl. No.: 14/728,271

(22) Filed: Jun. 2, 2015

(65) Prior Publication Data
US 2016/0356125 A1 Dec. 8, 2016

(51) Int. Cl.
*E21B 43/14* (2006.01)
*G06Q 10/04* (2012.01)
(Continued)

(52) U.S. Cl.
CPC .............. *E21B 43/14* (2013.01); *G06Q 10/04* (2013.01); *G06Q 10/067* (2013.01);
(Continued)

(58) Field of Classification Search
USPC .......................... 703/2, 5, 10; 166/245, 272.6
See application file for complete search history.

(56) References Cited

U.S. PATENT DOCUMENTS

| | | |
|---|---|---|
| 5,710,726 A | 1/1998 | Rowney et al. |
| 5,992,519 A | 11/1999 | Ramakrishnan et al. |

(Continued)

FOREIGN PATENT DOCUMENTS

| | | |
|---|---|---|
| GB | 2511019 A | 8/2014 |
| WO | 2012015521 A1 | 2/2012 |

(Continued)

OTHER PUBLICATIONS

Notification of Transmittal of the International Search Report and the Written Opinion of the International Searching Authority, or the Declaration; PCT/US/029454; dated Aug. 2, 2016, 13 pages.

(Continued)

*Primary Examiner* — Thai Q Phan
(74) *Attorney, Agent, or Firm* — Cantor Colburn LLP

(57) ABSTRACT

A method of online real-time estimation of production performance properties includes receiving real-time field data taken by downhole sensors, and estimating formation properties and production performance properties by applying the field data to a two or three-dimensional numerical transient thermal multiphase reservoir flow model, and automatically calibrating the model. Calibrating includes: selecting calibration parameters corresponding to values of selected model parameters, and applying the calibration parameters to the model to generate predicted properties that correlate with the selected model parameters, the predicted properties including flow rates and/or formation properties; automatically calculating a difference between the predicted properties and measured properties that correlate with the selected model parameters, and calculating an objective function value; performing an inversion that includes iteratively adjusting the selected model parameters until the objective function reaches a selected minimum value; and automatically updating the model by applying the selected model parameters associated with the minimum value.

26 Claims, 10 Drawing Sheets

(51) Int. Cl.
*G06Q 10/06* (2012.01)
*G06Q 50/02* (2012.01)

(52) U.S. Cl.
CPC ....... *G06Q 10/06313* (2013.01); *G06Q 50/02* (2013.01); *Y04S 10/54* (2013.01)

(56) References Cited

U.S. PATENT DOCUMENTS

| | | | |
|---|---|---|---|
| 6,101,447 | A | 8/2000 | Poe, Jr. et al. |
| 6,842,700 | B2 | 1/2005 | Poe |
| 6,945,095 | B2 | 9/2005 | Johansen |
| 7,062,420 | B2 | 6/2006 | Poe, Jr. et al. |
| 7,451,066 | B2 | 11/2008 | Edwards et al. |
| 7,536,905 | B2 | 5/2009 | Jalali et al. |
| 7,546,229 | B2 | 6/2009 | Jenny et al. |
| 7,567,079 | B2 | 7/2009 | Chen et al. |
| 7,640,149 | B2 | 12/2009 | Rowan et al. |
| 7,720,658 | B2 | 5/2010 | Ricard et al. |
| 7,725,301 | B2* | 5/2010 | Shah ............... E21B 47/10 703/10 |
| 7,765,091 | B2 | 7/2010 | Lee et al. |
| 7,860,654 | B2 | 12/2010 | Stone |
| 7,877,246 | B2 | 1/2011 | Moncorge et al. |
| RE42,245 | E | 3/2011 | Thomas et al. |
| 8,020,437 | B2 | 9/2011 | Zhan et al. |
| 8,204,693 | B2 | 6/2012 | Briers et al. |
| 8,244,509 | B2 | 8/2012 | Banerjee et al. |
| 8,271,247 | B2 | 9/2012 | Davidson |
| 8,275,593 | B2 | 9/2012 | Zhao |
| 8,280,635 | B2 | 10/2012 | Ella et al. |
| 8,290,632 | B2 | 10/2012 | Briers et al. |
| 8,301,429 | B2 | 10/2012 | Hajibeygi et al. |
| 8,469,090 | B2 | 6/2013 | Rossi et al. |
| 8,521,494 | B2 | 8/2013 | Narr et al. |
| 8,594,986 | B2 | 11/2013 | Lunati |
| 8,645,070 | B2 | 2/2014 | Hanson et al. |
| 8,650,016 | B2 | 2/2014 | Lunati et al. |
| 8,666,717 | B2 | 3/2014 | Dasari et al. |
| 8,682,621 | B2 | 3/2014 | Hollis |
| 8,682,622 | B1 | 3/2014 | Brenner et al. |
| 8,783,355 | B2 | 7/2014 | Lovell et al. |
| 8,805,660 | B2 | 8/2014 | Guyaguler et al. |
| 8,818,777 | B2 | 8/2014 | Howell et al. |
| 8,855,988 | B2* | 10/2014 | Strobel ............... G06F 17/5009 703/10 |
| 2006/0015310 | A1 | 1/2006 | Husen et al. |
| 2007/0005253 | A1 | 1/2007 | Fornel et al. |
| 2007/0016389 | A1 | 1/2007 | Ozgen |
| 2007/0032994 | A1* | 2/2007 | Kimminau ........... E21B 43/12 703/10 |
| 2008/0065362 | A1 | 3/2008 | Lee et al. |
| 2008/0099241 | A1 | 5/2008 | Ibrahim et al. |
| 2008/0255816 | A1 | 10/2008 | Neville |
| 2010/0082142 | A1 | 4/2010 | Usadi et al. |
| 2010/0299125 | A1 | 11/2010 | Ding et al. |
| 2011/0246161 | A1 | 10/2011 | Morton et al. |
| 2013/0275101 | A1 | 10/2013 | Hsu et al. |
| 2013/0304444 | A1* | 11/2013 | Strobel ............... E21B 43/26 703/10 |
| 2014/0054032 | A1* | 2/2014 | Affholter ........... E21B 43/24 166/272.6 |
| 2014/0129199 | A1 | 5/2014 | H. |
| 2014/0136173 | A1 | 5/2014 | Weng et al. |
| 2015/0204179 | A1* | 7/2015 | Affholter ........... E21B 43/24 166/245 |
| 2016/0281494 | A1* | 9/2016 | Shirdel ............... E21B 43/24 |

FOREIGN PATENT DOCUMENTS

| | | |
|---|---|---|
| WO | 2013016359 A2 | 1/2013 |
| WO | 2014029415 A1 | 2/2014 |

OTHER PUBLICATIONS

Battistelli, et al.; "Thermal Effects and Coupled Wellbore-Reservoir Flow During GHG Injection in Depleted Gas Reservoirs"; Jun. 2010; ISCHIA; 7 pages.

Fakcharoenphol, et al; "A Coupled Flow-Geomechanics Model for Fluid and Heat Flow for Enhanced Geothermal Reservoirs"; Jun. 2011; ARMA, American Rock Mechanics Association; 11pages.

Hu, et al.; "Integrated Wellbore/Reservoir Dynamic Simulation";SPE 109162; 2007; Society of Petroleum Engineers; 9 pages.

Lucia, et al.; "Fully Compositional and Thermal Reservoir Simulations Efficiently Compare EOR Techniques"; 2013; Society of Petroleum Engineers; 17 pages.

Swenson, et al.; "Modeling Flow in a Jointed Geothermal Reservoir"; Mechanical Engineering Dept., Kansas State University, Manhattan, KS 66506; 6 pages.

* cited by examiner

SYSTEM AND METHOD FOR REAL-TIME MONITORING AND ESTIMATION OF INTELLIGENT WELL SYSTEM PRODUCTION PERFORMANCE

BACKGROUND

Downhole temperature, pressure and fluid flow sensors are important tools used by the energy industry in measuring and evaluating hydrocarbon production from wellbores in earth formations. Such sensors are utilized to monitor downhole conditions so that production decisions can be made without direct wellbore intervention. Production monitoring systems using play important roles as numerous operators rely on it for performing their daily well management functions. In addition, models of formation and production systems are utilized in conjunction with such monitoring systems to assist in predicting and forecasting production performance, which is important for effective reservoir management and control.

SUMMARY

A method of online real-time estimation of production performance properties of one or more hydrocarbon production operations includes receiving real-time field data from a field source at a processor that stores and displays information, the field data including at least one of operational parameters and measurements taken by one or more downhole sensors during the one or more production operations, and estimating formation properties and production performance properties associated with the field source by applying the field data to a two or three-dimensional (2-D or 3-D) numerical transient thermal multiphase reservoir flow model, and automatically calibrating the numerical transient thermal multiphase reservoir flow model. Calibrating includes: selecting calibration parameters corresponding to values of selected model parameters, and applying the calibration parameters to the reservoir flow model to generate a solution that includes predicted properties that correlate with the selected model parameters, the predicted properties including at least one of flow rates and formation properties; in response to receiving real time measurement data from the field source, automatically calculating a difference between the predicted properties and measured properties obtained from the real time measurement data that correlate with the selected model parameters, and calculating an objective function value based on the difference; performing an inversion that includes iteratively adjusting the selected model parameters until the objective function reaches a selected minimum value; and automatically updating the transient thermal multiphase reservoir flow model by applying the selected model parameters associated with the minimum objective function value. The method further includes using the automatically calibrated transient thermal multiphase reservoir flow model to forecast at least one of: short-term reservoir parameters, long-term reservoir parameters, near-wellbore reservoir features and production performance properties.

A system for estimating and forecasting production properties of one or more hydrocarbon production operations includes a data aggregation module configured to communicate with a field source via a web-based network and receive field data therefrom, the field data including at least one of operational parameters and measurements taken by one or more downhole sensors, a transformation module configured to transform field data into an industry data format, and a modelling module configured to automatically input the field data into a numerical transient thermal multiphase reservoir flow model available to a plurality of users, and estimate formation properties and production properties associated with the field source based on the reservoir flow model. The system also includes a calibration module configured to receive calibration parameters corresponding to values of selected model parameters, apply the calibration parameters to the reservoir flow model to generate a solution that includes predicted properties that correlate with the selected model parameters, the predicted properties including at least one of flow rates and formation properties, the calibration module configured to automatically calculate a difference between the predicted properties and measured properties obtained from the field source that correlate with the selected model parameters, and calculate an objective function value based on the difference. The system further includes an inversion module configured to perform an inversion that includes iteratively adjusting the selected model parameters until the objective function reaches a selected minimum value, and automatically update the reservoir flow model by applying the selected model parameters associated with the minimum objective function value.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

Figure 1:
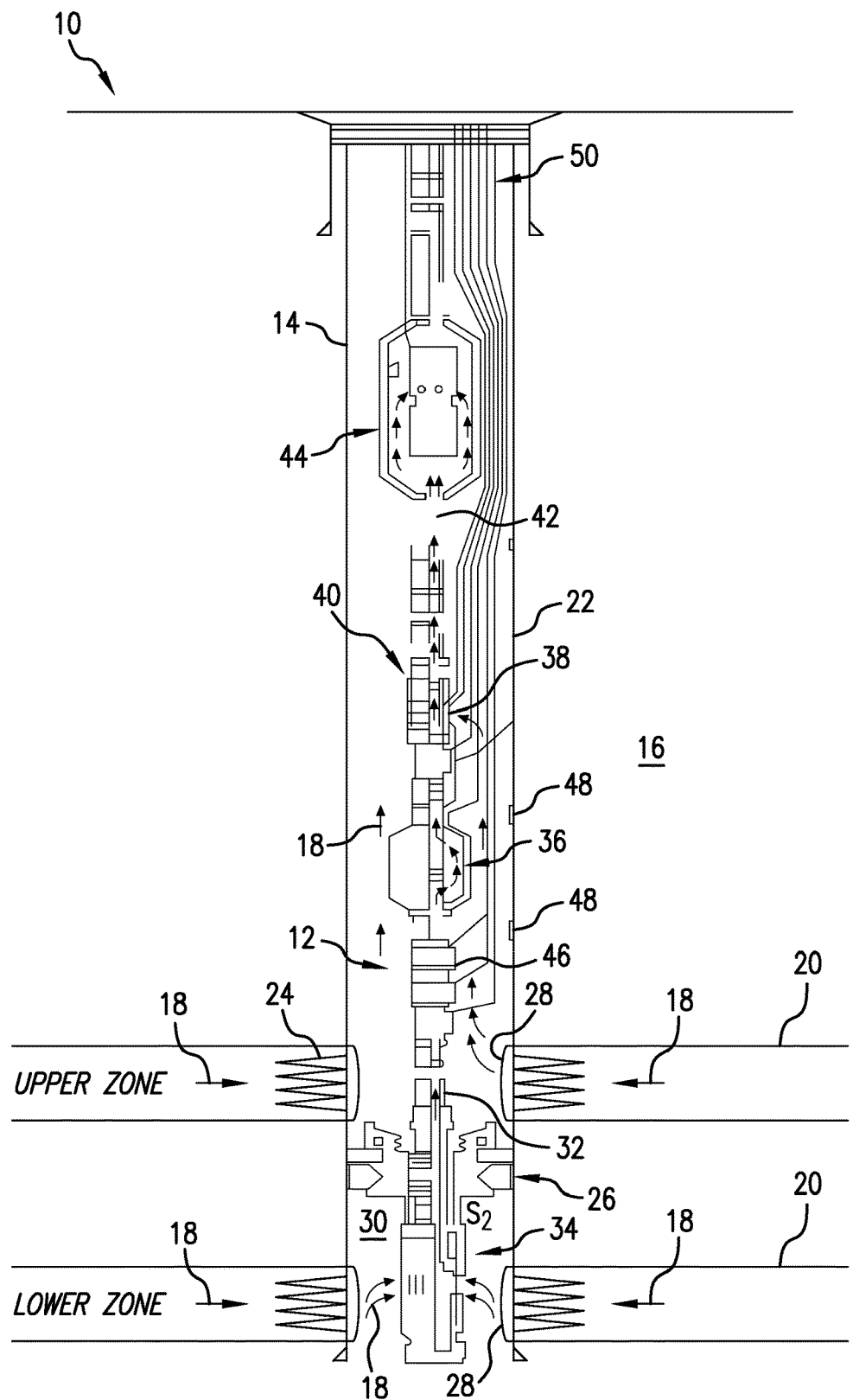
FIG. 1 depicts an embodiment of a hydrocarbon production system.

Systems and methods are described herein that provide for modeling aspects of hydrocarbon production operations, such as reservoir properties (i.e., formation properties), operational parameters and production properties. Fast and accurate forward models incorporate partial differential equation models for subsurface multi-phase flow, which can be used to estimate formation, borehole and production properties (e.g., oil, gas and/or water rates from single and multi-zonal well systems) and predict or forecast such properties based on measurement data. The systems and methods produce useful well surveillance information and can serve as a primary well rate metering system (virtual flow metering using temperature and pressure data) or as a backup to multi-phase flow meters.

Under the assumption of the subsurface multiphase flow model, an inversion algorithm is configured to estimate formation properties and/or production properties (e.g., pressure, temperature, distribution of reservoir temperature and pressure, distributed reservoir parameters, near-wellbore features and single or multi-phase flow rates) specific to a given measurement domain by numerically reproducing available measurement data. The inversion algorithm may also be used to estimate initial forward model parameters, update model parameters continuously or periodically and in real time if desired, and calibrate the forward model.

An embodiment of a system for automatic online monitoring, data analysis, production evaluation and production forecasting includes processing devices configured to receive real time measurement data from one or more energy industry sources such as single and/or multi-zonal production wells. Measurement data is obtained from downhole sensor devices such as permanent downhole gauges, distributed temperature sensors, distributed acoustic sensors and/or production logging tools. The measurement data is automatically filtered and input into a forward model of subsurface thermal multi-phase flow through porous media, which incorporates measurement response functions for numerical simulation using measurement data. The forward model is a nonlinear discrete dynamic system with linear observation operators, for which a Monte Carlos-based data assimilation algorithm may be applied for improving forecasting under statistical uncertainties.

Embodiments described herein also include system architecture for online automatic (e.g., real time) processing of dynamically obtained data, which assists operators in making critical day to day production performance decisions under various uncertainties. "Online" processing refers to processing data received in real time or otherwise during a production operation, e.g., performing observe-invert-predict cycles under closed-loop conditions. Exemplary system components include functional interfaces for sensor data transmission, sensor data management, sensor data filtering and manipulation, inverse-based data interpretation, and for display using a dynamic dashboard system that displays information such as measurement data, forecasts and model information. The functional interfaces may include, for example, data downloading and uploading utilities, a set of instructions for executing calibration processes, advanced visualization tools, health alarming, key performance reports, and dashboards.

The system also includes capabilities for transforming received measurement data into a single format for use by the system, thereby allowing for effective assimilation of data from various sources and easy incorporation of new sources.

The systems and methods described herein provide critical information on a well's capabilities, as well as information such as production performance characteristics, transient reservoir pressure-temperature response, reservoir thickness, permeability, water saturation, water break through time, water-oil ratio, water cut, and reserves tracking for any stratified reservoir layer where a gauge is reporting pressure and temperature. The systems and methods also provide advanced model calibration and uncertainty quantification techniques to provide online probabilistic-based estimation of gas-oil-water flow rates and effective reservoir management through continuous (real-time) reservoir production monitoring, production allocation, performance forecasting (look ahead) and virtual individual well testing.

Referring to FIG. 1, an exemplary embodiment of a hydrocarbon measurement and/or production system 10 includes a production string 12 that is shown disposed in a borehole 14 that penetrates at least one earth formation 16 during a measurement and/or hydrocarbon production operation. The borehole 14 is shown as a vertical borehole, but is not so limited, and may include deviated and/or horizontal wells or well sections. In addition, the borehole 14 may represent multiple boreholes and/or multilateral wells. "Production string" as used herein, refers to any structure suitable for being lowered into a wellbore and is not limited to the structure and configuration described herein.

Formation fluid 18 is produced from one or more production zones, which in this embodiment includes two production zones 20, an upper production zone and lower production zone. The borehole may be lined with a casing 22 that has perforations 24 adjacent the production zones. A packer 26, e.g., a retrievable packer, positioned above or uphole of the lower production zone perforations 24 isolates the lower production zone from the upper production zone. Screens 28 may be installed adjacent the perforations 24 (upper and/or lower) to prevent or inhibit solids, such as sand, from entering into the borehole from production zones.

Formation fluid from the lower production zone enters the annulus 30 of the borehole 12 through the perforations 24 and into a tubing 32 via a flow control valve 34. The flow control valve 34 (e.g., an inflow control valve (ICV) or automatic ICV (AICV)) may be a remotely control sliding sleeve valve or any other suitable valve or choke that can regulate the flow of the fluid from the annulus into the production tubing 32. An adjustable choke 36 in the tubing 32 may be used to regulate the fluid flow from the lower production zone to the surface. The formation fluid from the upper production zone enters the annulus 30 (the annulus portion above the packer 26) via perforations. The formation fluid 18 from the upper zone enters production tubing via inlets 38. An adjustable valve or choke 40 regulates the fluid flow into the tubing and may be used to adjust flow of the fluid to the surface. Each valve, choke and other such device in the well may be operated electrically, hydraulically, mechanically and/or pneumatically from the surface. The fluid from the upper production zone and the lower production zone enter the line 42.

The system may also include an artificial lift mechanism, such as an electrical submersible pump (ESP), a gas lift system, a beam pump, a jet pump, a hydraulic pump or a progressive cavity pump, to pump fluids to the surface. For example, the system 10 includes an ESP 44 controlled by an ESP control unit.

Various sensors are placed at suitable locations in the borehole 14 and/or the production string 12 to provide measurements or information relating to downhole parameters of interest. Exemplary sensors include temperature sensors (e.g., a distributed temperature sensing (DTS) system), pressure sensors, flow measurement sensors, resistivity sensors, sensors that provide information about density, viscosity, water content or water cut, and chemical sensors.

Density sensors may be fluid density measurements for fluid from each production zone and that of the combined fluid from two or more production zones. Resistivity sensors may provide measurements relating to the water content or the water cut of the fluid mixture received from each production zones. Other sensors may be used to estimate the oil/water ratio and gas/oil ratio for each production zone and for the combined fluid. The temperature, pressure and flow sensors provide measurements for the pressure, temperature and flow rate of the fluid.

For example, one or more production logging tools (PLTs) 46 are incorporated in the production string to measure fluid properties such as flow rate, density, phase velocity, water holdup, pressure and temperature. Other sensors such as permanent downhole gauges (PDGs) 48 may be permanently installed in the borehole to provide acoustic or seismic measurements, formation pressure and temperature measurements, resistivity measurements and measurements relating to the properties of the casing and/or formation. Sensors also may be provided at the surface, such as a sensor for measuring the water content in the received fluid, total flow rate for the received fluid, fluid pressure at the wellhead, temperature, etc. The signals from the downhole sensors may be partially or fully processed downhole (such as by a microprocessor and associated electronic circuitry that is in signal or data communication with the downhole sensors and devices) and then communicated to the surface controller via a signal/data link.

In one embodiment, various components of the system are in communication with a surface processing device or system. The surface processing systems may be configured as a surface control system that controls various production and/or injection parameters, receives data from downhole and surface sensors, analyzes the data and/or displays measurement data, analysis results and/or prediction or forecasting results. The surface processing system includes components as necessary to provide for storing and/or processing data collected from various sensors therein. Exemplary components include, without limitation, at least one processor, storage, memory, input devices, output devices and the like.

A variety of electrical and/or data communication lines 50 extend from the surface into the borehole to operate various devices in the borehole and obtain measurements and other data from various sensors. For example, lines may operate the chokes and valves, provide communication between downhole components and/or surface components, and/or provide electrical power.

In one embodiment, the control valves or other inflow control devices and sensors are disposed downhole in a "smart" or "intelligent" well configuration. Smart well technology involves measurement and reservoir flow control features that are disposed downhole. Installation of downhole active flow control devices (multi-node), inflow control valves, measurement devices (e.g., for pressure, temperature and flow rate), and/or downhole processing facilities such as hydro-cyclones in the borehole allows for active production monitoring and control. Intelligent wells facilitate control of parameters such as fluid flow and pressure, and facilitate periodically or continuously updating reservoir models during production.

The systems and methods described herein provide features for performing and facilitating production monitoring, data analysis and production prediction and optimization. Various computational algorithms, referred to collectively as virtual flow metering (VFM) algorithms, perform processes including estimation of multi-phase flow rates and production allocation from single and multi-zonal wells using a coupled thermal reservoir-borehole model, and automatic and/or online production prediction and model calibration.

Processes that can be performed using the algorithms include estimating formation properties and production properties (e.g., fluid production rates, also referred to as well rates), performing automatic virtual well test analyses, forecasting of future production performance, automatically calibrating devices such as downhole flow meters (DFMs) by integrating production data, monitoring inflow control devices, predicting and optimizing flow control device settings to improve hydrocarbon recovery and mitigate water/gas breakthrough risk, and managing sensor data for improved production monitoring and characterization (pressure and temperature transient detection) based on pattern recognition.

The algorithms use a modeling framework that includes partial differential equation models for subsurface thermal multiphase flow through porous media and a borehole. A fast and accurate forward model incorporates measurement response functions for numerical simulation using measurement data. The forward model is a nonlinear discrete dynamic system with linear observation operators, for which a Monte Carlos-based data assimilation algorithm may be applied for improving forecasting under statistical uncertainties. Under the assumption of the subsurface multiphase flow model, an inversion approach (also referred to as an inversion model or inversion process) estimates well rates and formation properties specific to a given measurement domain by numerically reproducing the available measurements.

The systems and algorithms implement the forward and inverse models to predict and calibrate multi-phase flow rates and formation properties from single and multi-zonal wells. The models are useful for interpreting various types of measurement data, such as permanent downhole gauge (PDG) data, production logging tool (PLT) data and distributed temperature sensor (DTS) data.

Figure 2:
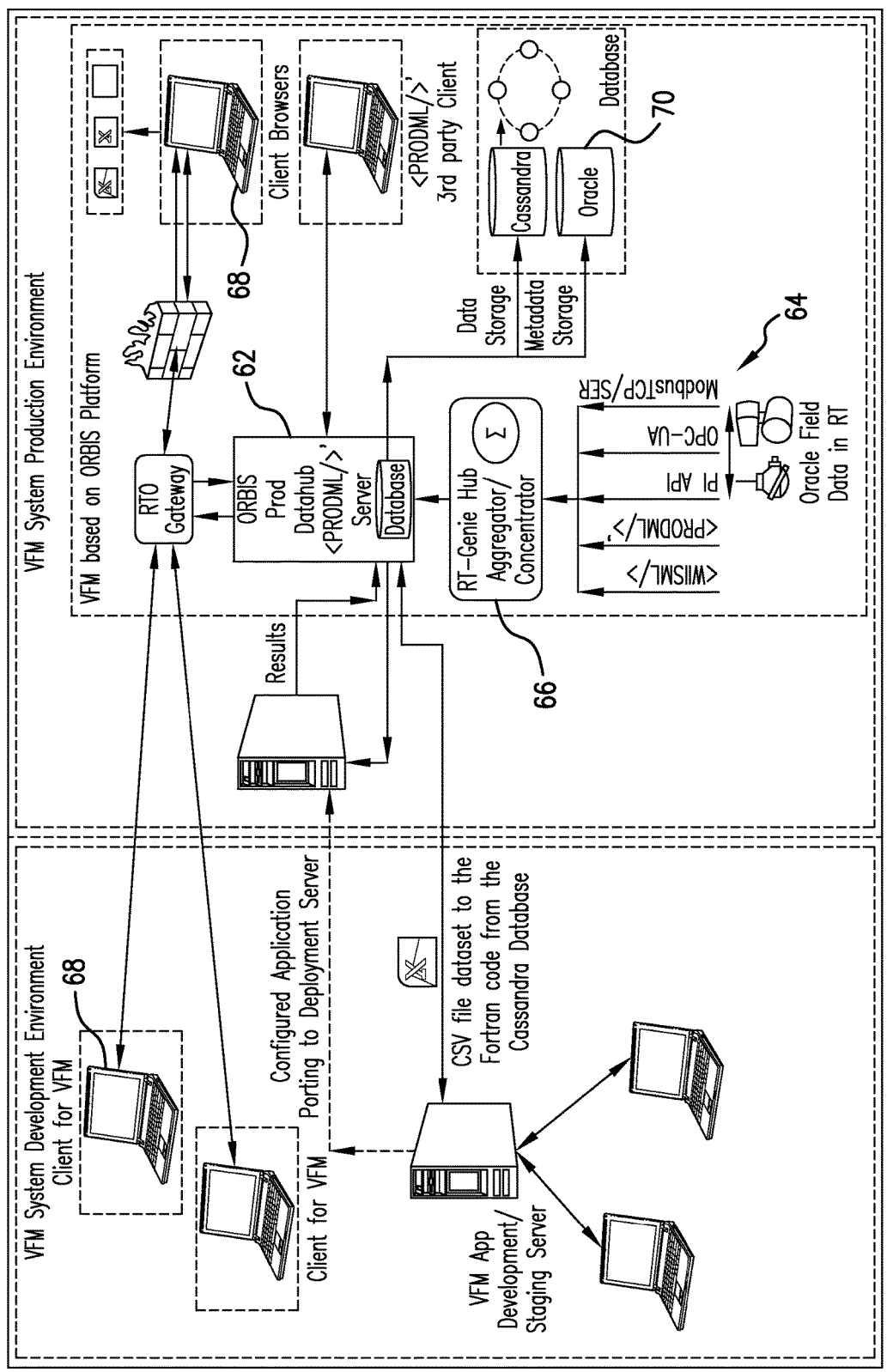
FIG. 2 depicts an embodiment of a web-based system for facilitating data collection, reservoir monitoring, data analysis, predictions and forecasts relating to well production.

FIG. 2 shows an embodiment of a system 60 for facilitating data collection, reservoir monitoring, data analysis, predictions and forecasts relating to well production. The system may also be configured to control wells or production systems or send control or optimization information to the production systems or users. The system 60 is configured to retrieve both static and dynamic real time data from production systems and/or a centralized processor and remotely analyze or interpret the data.

The system 60 includes a production data hub 62 that includes processing and storage devices configured to receive data from various field sources 64, such as production wells, drilling platforms, and measurement or formation evaluation systems. The data hub 62 may be any type of storage and processing device, such as one or more servers. An exemplary unit is a PetroSocial Production Data Hub by Performix, a subsidiary of Baker Hughes Inc.

The production data hub 62, in one embodiment, includes or is connected to a an aggregation module, such as a data aggregator 66 configured to receive static and real time data from the field sources 64. The aggregator 104 is configured to transform received data into a format suitable for analysis and modeling. Exemplary formats include Production Markup Language (PRODML) for production data, Wellsite Information Transfer Standard Markup Language (WITSML), OPC Unified Architecture (OPC-UA), Modbus TCP, FTP and ASCII. The aggregator 104 transforms data from various formats into a single format (e.g., PRODML) that will be used by a modeling application described further below. The data aggregator 66 or other aggregation module may use any suitable language and/or protocol, such as Modbus, OPC-UA, Lightbox and others.

The data hub 62 is connected to various other components, such as a network gateway for interfacing with clients 68. Clients 68 can access the data hub 62 to receive software, data (raw and computed) and modeling or prediction results. The clients 68 include, for example, local clients and remote clients connected to the data hub 62 via the Internet.

The data hub 62, in addition to receiving data from field sources 64, may receive data from the clients 68 and/or one or more databases 70. Such data includes measurement data, reservoir property data, initial model conditions, and information regarding well type, geometry and completion/production equipment.

Data that can be utilized by the system includes any relevant energy industry data. As described herein, "energy industry data" refers to data generated by a variety of energy industry operations for which the methods described herein can be performed. Examples of such operations include various stimulation, treatment and/or production operations. Production operations include any operation or process configured to facilitate production of hydrocarbons from a subterranean formation. Treatment operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Other examples include fluid injection operations, such as a stimulation, fracturing, clean-out or production operations.

Generally, the system 60 and/or components thereof, perform a variety of functions related to production analysis and prediction. The system 60 executes an analysis and modeling application stored in a memory of a processing device, e.g., a client 68, that utilizes a set of models collectively referred to as a virtual flow metering (VFM) model.

Prior to using the VFM model, the aggregator 66 transforms received data into a selected format. The formatted data is then put through a data sorting, screening and filtering process, which includes outlier removal, data de-noising and data reduction. The formatted and filtered data may be consolidated and archived to assist in the monitoring of real-time trends.

Selected formatted and filtered data is input to a thermal reservoir modeling engine or module that employs a two or three-dimensional (2-D or 3-D) thermal reservoir model capable of coupling multiphase flow and transport processes in single and multi-layered heterogeneous reservoirs completed with and without intelligent completions systems. The modeling engine or module may run on any suitable processing device or configuration, such as a scalable server or virtual machine. The modeling engine or module, for example, runs on the production data hub 62. In one embodiment, the modeling engine is configured to estimate production rates as well as formation, borehole and/or fluid properties. Real time information may be generated, such as multiphase flow rate determination in single and multi-zonal wells, and formation properties estimation in single and/or multi-zonal wells. For example, the modeling engine calculates hourly oil, gas and water flow rates for each individual well and/or clusters of wells in real time.

In addition, the thermal reservoir model employed by the application may be used to generate forecasts of production output for one or more production wells. This forecasting may be standard forecasting based on received data representing selected time intervals (e.g., four week forecasting using 30-minute data intervals), and/or "what-if" forecasting that predicts production output in response to multiple scenarios. Examples of forecasts include forecasts of short-term reservoir parameters, long-term reservoir parameters, near-wellbore reservoir features and production performance properties. Production performance properties include, e.g., distributed reservoir parameters, multiphase flow rates, cumulative multiphase volumes, near-wellbore features, and distribution of reservoir temperature and pressure. Exemplary reservoir parameters include formation permeability, relative permeability, fluid saturation, reservoir pressure, reservoir temperature, and reservoir fluid properties. Short-term forecasts include, e.g., forecasts of day to day and/or weekly production, and long-term forecasts include forecasts of zonal three-phase flowrates and produced reservoir fluids cumulatives over longer periods (e.g., weeks or months).

In one embodiment, the application uses the thermal reservoir model to predict production parameters for single or multiple zones of an intelligent well system equipped with downhole inflow control valves. Raw transient field observed data is collected by the system 60, such as PDG data, DTS data and/or PLT data, and the application uses the observed data and corresponding initial and boundary conditions that include settings of downhole inflow valves that existed in the well when said observed data was collected.

The thermal reservoir model is a forward model that includes a partial differential equation model for forward simulation of two or three-dimensional (2-D or 3-D) subsurface transient thermal multiphase flow through porous media and the borehole. The forward model is a nonlinear discrete dynamic system with linear observation operators, for which a Markov Chain Monte Carlos-based data assimilation algorithm may be applied for improving forecasting under statistical uncertainties.

The forward model employs reservoir flow equations based on mass continuity equations for multi-phase (e.g., oil, gas and/or water) production fluid conservation (mass continuity) equations. The mass continuity equations can be represented as:

$$\partial(\varepsilon \rho_i s_i)/\partial t + \nabla \cdot (\rho_i u_i) = \nabla \cdot (D_{vi} \nabla \eta_{vi}) + S_i,$$

where t is time, $\varepsilon$ is porosity, $s_i$ is the saturation fraction of a phase "i", $\rho_i$ is the density of the phase, $u_i$ is the flow velocity of the phase i, $D_{vi}$ is the diffusivity of the phase i, $\eta_{vi}$ is the gas vapor mole fraction, and $S_i$ is a mass source/sink (e.g., production/injection) term.

The forward model also employs reservoir energy equations which have the following general form:

$$\partial E/\partial t + \Sigma_i \nabla \cdot (\rho_i h_i u_i) = \nabla \cdot (K_{Te} \nabla T + h_v D_v \nabla \eta_v) + E_{ss},$$

where E is the total internal energy density, $h_i$ is the enthalpy per unit mass of phase i, $K_{Te}$ is the effective thermal conductivity, T is temperature, $D_v$ is the diffusivity in the gas phase, $\eta_v$ is the gas vapor mole fraction, and $E_{ss}$ is an energy source/sink term.

Calculation of the forward model includes performing a fluid property simulation using available information and assumptions. The fluid property simulation includes inputting PVT (pressure, volume and temperature) properties into a compositional simulator to predict thermodynamic and transport properties of fluids produced from a formation or reservoir. The thermodynamic and transport properties allow for prediction of fluid behavior from the reservoir along the borehole. An exemplary composition simulator that may be used for this process is PVTSim software produced by Calsep A/S (Denmark).

The fluid property simulation is a multicomponent and phase equilibrium simulation that predicts thermodynamic and transport properties for hydrocarbon fluids as well as other fluids, such as various water samples and hydrate inhibitors, using PVT data. Estimation of the thermodynamic and transport properties is accomplished by building an equation of state model, and tuning the model using nonlinear regression.

For example, a fluid property model is constructed using the Soave-Redlich-Kwong (SRK) equation of state in order to generate the thermodynamics and transport properties data (e.g., tables) used to run the forward models. The simulation is used to estimate fluid composition data (e.g., generate composition files of the wells), and checks are conducted to see how key parameters match with the PVT data provided by a user or operator. The given fluid compositions are used to tune the fluid properties model.

The fluid composition data is used to perform a non-linear regression analysis to adjust the SRK equation of state. The basic objectives of using the non-linear regression in the fluid property model is to determine the optimum set of multipliers such that the observed or measured PVT data best match or fit as closely as possible to the calculated data from the SRK equation of state fluid model. Key parameters on which the regression is performed include any set of three independent variables. Examples of such variables include gas-oil ratio (GOR), oil density or API gravity, oil viscosity and bubble point pressure. The GOR, API gravity and bubble point pressure variables are chosen to minimize the objective functions with a value between +1%.

The composition of the reservoir fluid for each well is determined by flashing the tuned fluid property model at a pressure slightly below reservoir pressure to obtain liquid and vapor components. New fluid composition data (e.g., composition files) is generated after properly tuning the plus fraction properties of the initial composition data. The simulation is used to generate fluid properties needed to build the forward model. In one embodiment, a lookup table (referred to as a "thermofile") is generated that includes thermodynamic properties (e.g., enthalpy, heat capacity at constant pressure, heat capacity at constant volume, vapor pressure, boiling point, enthalpy of vaporization, density, thermal expansion, adiabatic and isothermal compressibility and others) and transport properties (e.g., viscosity, thermal conductivity and diffusion coefficient) of a given reservoir fluid.

Additional equations and relationships are used as part of the forward model. The equations described herein are not intended to limit the number or form of equations used by the model. Darcy's equation is used to provide equations for pressure and saturation, and may be represented as:

$$ui = kri/\mu i(T,C)(\nabla Pw + \rho wg),$$

where ui is the phase velocity, μi is the viscosity of the phase i, T is the temperature, C is concentration of the phase i, kri is the relative permeability, g is gravity, and Pw is the pressure in the wetting phase.

Capillary pressure Pc in the wetting phase is defined as Pnw−Pw, where Pnw is the pressure in the non-wetting phase. Effective thermal conductivity $K_{Te}$ can be represented as:

$$K_{Te} = K_T(si, so, sw) K_T(rock),$$

where $K_T$(si, so, sw) is the thermal conductivity of the multi-phase flow, and $K_T$(rock) is the thermal conductivity of the surrounding formation.

The governing partial differential equations are coupled as follows: $s_o + s_w + s_g = 1$, where $s_o$, $s_w$ and $s_g$ are the saturation fraction of oil, water and gas, respectively, and $$E = \varepsilon\{\Sigma_i[s_i\rho_i e_i(T,P)] + s_g\rho_v e_v(T)\} + (1-\varepsilon)c_{pr}\rho_r T,$$

where $e_i$ is the internal energy per unit mass of a phase I, and $c_{pr}$ is the specific heat of rock A numerical solution using the model includes discretizing the model domain using the finite volume approach. For example, the domain is divided into an orthogonal grid. Grid cell widths can be variable in each spatial direction.

The governing partial differential equations are integrated over one time step over each grid cell, giving the mass and energy conservative forms. Then application of Green's theorem (divergence theorem) converts volume integrals to surface integrals which reduce the order of derivatives. Velocities and pressure, concentration and temperature gradients are then discretized at boundaries and surfaces of grid cells. The harmonic average of thermal conductivities and permeabilities is used at grid cell face centers, pressures, concentrations (phase fractions) and temperatures are used at cell centers. The forms generated guarantee mass and energy conservation for each grid cell for each time step. The resulting equations are finite differenced, and a set of coupled, frequently non-linear algebraic equations are obtained and solved. To solve the set of equations, Newton-Raphson is applied to this set, resulting in a sparse matrix equation to solve.

Initial conditions used to run the forward model include, e.g., pressure (P), temperature (T), water-oil ratio (WOR), gas-oil ratio (GOR), and concentrations of any chemical solutes as a function of borehole radius (r) and depth (z) at an initial time "t". Permeability and porosity are also specified as functions of position. Random and stochastic distributions of properties are possible, as well as uniform distributions in each producing layer. The boundary conditions required by the model are P, T, WOR, GOR and concentrations of any solutes in the borehole, and P, T, WOR, GOR and concentrations of solutes at the outer side of the domain (shut-in values).

The Darcy's formulations for phase velocities are substituted into the mass continuity equations to provide equations for pressure and saturation. For a single phase, one equation for pressure results. For two phases, two coupled partial differential equations for pressure and saturation are solved. The model may be single phase, two-phase, three-phase or more.

The governing partial differential equations are written in conservative form, that is, as integrals, which are then discretized using a control volume grid. Pressures, temperatures, saturations and concentrations are grid-cell centered, relative and effective permeability and phase velocities are face-centered. Several options are provided for relative permeability, e.g., Brooks-Corey, van Genuchten, Mualem, and user-supplied lookup tables.

The equations for pressure and saturation are solved using an implicit, backward in time Euler algorithm. The set of discretized equations are solved using Newton-Raphson iteration. During each time step, first, pressure and saturation are determined through an iterative process, and then the energy transport and solute transport are updated.

An implicit algorithm is applied to these equations as well. Then the equation of state is used to reconcile pressure, temperature and saturations; saturations may be modified if critical points have been reached. A new time step is computed based on the Courant limit.

The entire numerical solution process may be repeated for a selected number of successive time steps.

In one embodiment, for pressure and temperature simulations, a 1-dimensional (1-D) radial geometry is used for each producing layer or sublayer, divided into, e.g., 50 grid cells. The grid cells extend radially from the borehole center out to a distance of, e.g., 100 feet. This distance may be any suitable selected distance that is large enough so that P, T and saturations at the outer edge of the domain change very little during any of the simulations.

The grid cell widths increase geometrically with radius. If multiple but vertically separated producing layers are present in the same well, single layers between the producing layers are included, having zero permeability. The simulations with this arrangement generally take from a few seconds of computer time for each forward solution during an inverse simulation (which has used just one day of data for the PDG cases), up to a few minutes for a PDG predictive simulation that covers the time duration of data provided.

Figure 3:
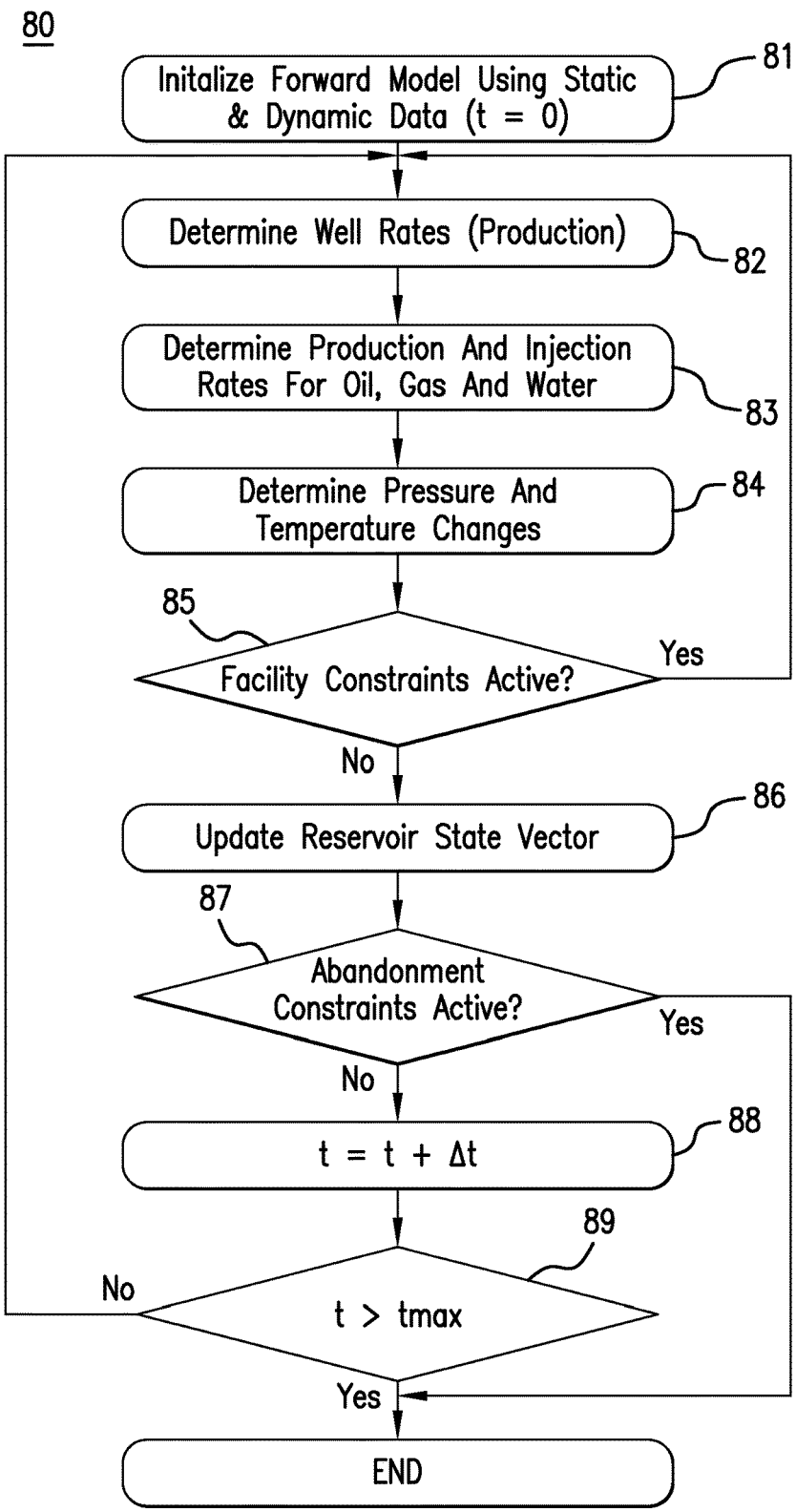
FIG. 3 depicts a process for applying static and dynamic data to a forward thermal reservoir model.

FIG. 3 illustrates an exemplary method 80 for applying the forward model. At block 81, the forward model is initialized by inputting static data such as well trajectory and injection fluid properties, and inputting dynamic data such as temperature and pressure measurements (e.g., PDG and/or PLT measurements) taken downhole at a specific time (t=0). In the absence of certain design parameters from provided datasets, certain assumptions and starting values may be assumed, such as static geothermal gradients of reservoirs, thickness of the producing zones and others.

Input data includes various types of information that is used to build the model. Examples of such information include well completion diagrams, full fluid composition from well test data and/or PVT report, well and/or wellhead instrument locations and datasheets (e.g., pressure sensors, temperature sensors, valves), and locations/existence of production devices such as safety valves, master valves, wing valves and transmitters. Other information includes well choke openings (current time), status, choke valve data and trim type, inflow control valve (ICV) current time, positions, status, ICV valve data and trim type (for multiple zones completed with ICV). Still other information includes before and after ICV pressures and temperatures, jumper and manifold isometrics, test separator pressure and temperature, and reservoir data information.

At block 82, production rates are estimated, and at block 83, production and injection rates for individual phases (e.g., oil, gas and water) are estimated. At block 84, pressure and temperature changes are calculated. At block 85, estimated parameters including production and/or injection rates are compared to pre-selected facility constraints (e.g., oil, gas and water processing capacity), and if the estimated parameters exceed such constraints, they are re-calculated. If the facility constraints are not exceeded, the reservoir state vector, which includes values of the model parameters, is updated at block 86. At block 87, one or more model parameters are compared to an abandonment constraint (e.g., a WOR value). AT block 88, the method is repeated for one or more successive time points (t+Δt) until a maximum time point is reached (block 89). During predictive or forecasting simulations, oil, gas and water flows vs time (if PDG data was used) or depth (PLT) are stored, for example, as a file called 'oil-gas-flux-v-time'.

The system also employs an inverse model in conjunction with the forward model to perform functions such as calibration of the forward model and real time automatic adjustment of model parameters. The inverse model is used to generate real time estimates of parameters such as production rates (also referred to as well rates) and formation properties specific to a given measurement domain by numerically reproducing available measurements and comparing them to actual measurements. The inverse model employs an inversion algorithm that attempts to minimize an objective function that is dependent on the difference between actual measurement values and values estimated using the forward model.

Solving the inverse model includes calculating an objective function that reflects the difference between the actual measurement values and the estimated values, and iterating until the objective function is minimized or otherwise reduced to selected value. Objective functions in inverse models depend on the norm used, but they generally are some function of the differences between measurements and simulations. A variety of approaches can be taken, which typically fall into two categories: gradient based algorithms (such as variations of Levenberg-Marquardt, Bayesian analysis, interval analysis, and others), and non-gradient search algorithms (such as genetic algorithms, particle swarm optimization and differential evolution).

In one example, for PDG and PLT simulations, a standard L2 norm-based (least squares type) objective function is used. In these inverse simulations, the standard deviation of error or uncertainty at each data point is needed. In one embodiment, the standard deviation of each data point is assumed to be the same, that is, all data are equally important. The various data points can be weighted unevenly, if such information is available. A minimization algorithm such as the Levenberg-Marquardt (L-M) algorithm provides a solution to the inverse problem.

There are many variants of the basic L-M algorithm, each with some advantage relative to the other versions. The algorithm is a blend of first derivative and second derivative (e.g. Hessian) searching; a first derivative search is used when far from the minimum. The algorithm switches to the second derivative as the minimum is approached. The algorithm determines how to blend the first and second derivatives. First derivatives are approximated numerically through a series of forward simulations, and a matrix of second order partial derivatives, such as a Hessian matrix, is built up as the iterations proceed. The algorithm proceeds through a number of iterations until the algorithm converges to a minimum. Generally, about 50 iterations are specified, which typically is sufficient to reach convergence of the inverse process.

Figure 4:
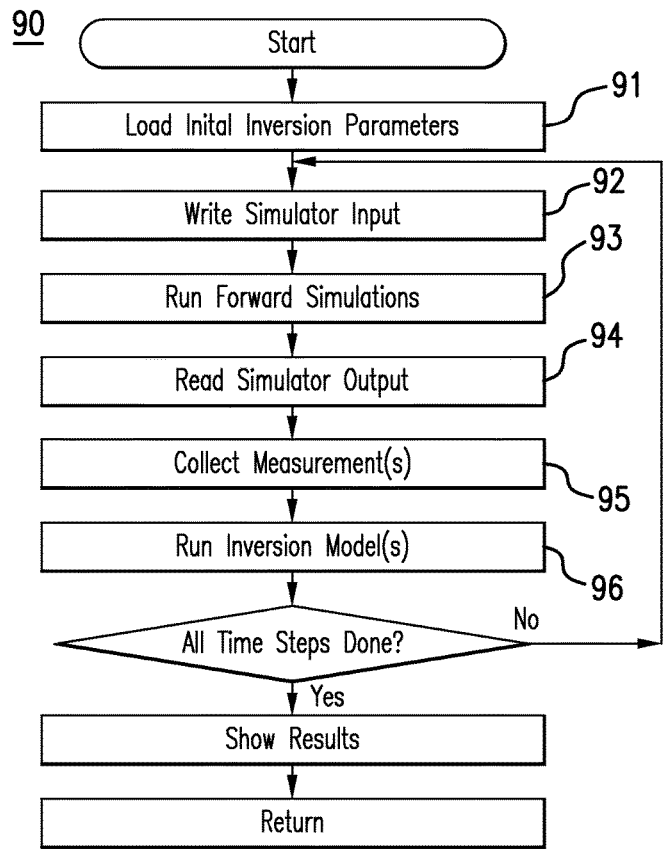
FIG. 4 depicts an exemplary process of applying an inversion algorithm to the forward model of FIG. 3.

FIG. 4 illustrates a workflow 90 that schematically shows how the inversion algorithm proceeds. The inversion process performed according to this algorithm is repeated for a number of successive time steps or intervals. At block 91, initial inversion parameters are loaded to the inversion algorithm. The initial inversion parameters are similar to those input to the forward model, and include static parameters and pressure, temperature and/or flow rate measurements. These initial parameters may be based on measurement data at a current time step, a previous iteration of the model, historical data and/or best guesses based on available information.

At block 92, simulation input is prepared, which includes the initial parameters, and forward simulations are run using the forward model at block 93. At block 94, forward simulation output is received, such as fluid flow rates, multi-phase flow rates and production allocation. At block 95, additional measurements are taken during production (at a next time step immediately following the current time step), such as downhole pressure, temperature and flow rates. At block 96, an inversion model is run to calculate values of expected measurements, e.g., pressure, temperature and/or flow rates, compare the expected measurements to the additional measurements and iteratively adjust parameters of the forward model. This process is performed for one or more time steps, and the results are output for comparison.

The forward and inversion models may be used for various operations in conjunction with the forward model. Such operations include, but are not limited to, automatic forward model parameter estimations, updates and calibration processes. Exemplary calibration processes include calibration runs, pausing a calibration run and determining intermediate values, observing intermediate values, and resuming a calibration run.

These operations are discussed further below in conjunction with an exemplary modelling application showed schematically in FIG. 4. This example is not meant to be limiting, but rather to illustrate how various components of the application can be used together to accomplish these operations.

Figure 5:
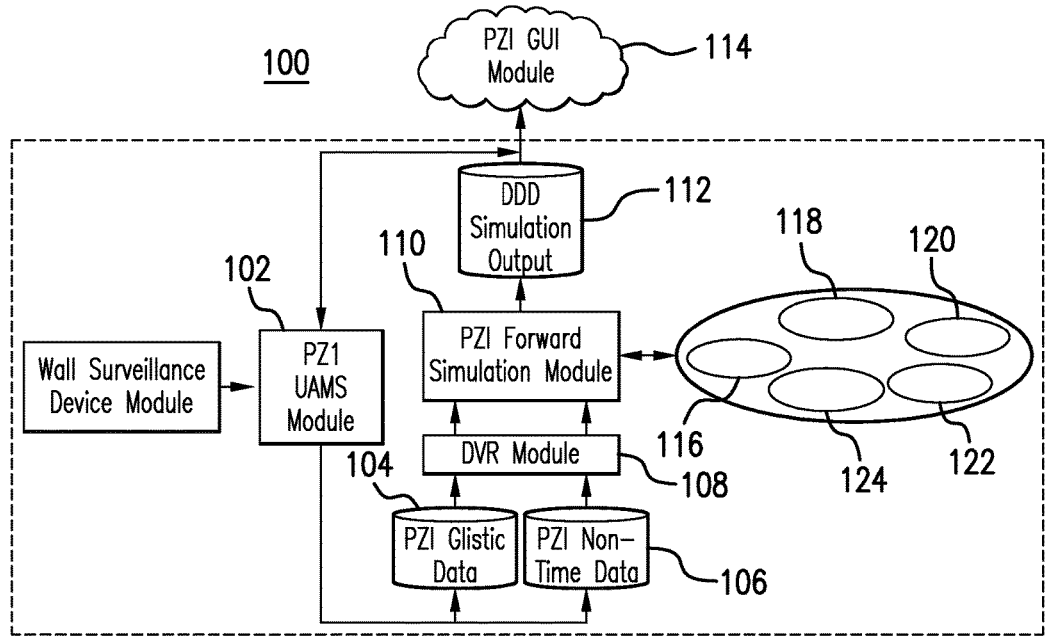
FIG. 5 is a schematic representation of an exemplary application configured to perform functions such as reservoir modelling, model calibration, and production forecasting.

Referring to FIG. 5, an exemplary application 100 includes a database management system (DBMS) 102 that receives data from field sources and/or databases, and processes the data, e.g., by filtering and converting the data into a common format that is used by other modules. In one embodiment, the DBMS 102 is communicatively coupled to field sources and receives data therefrom. For example, the DBMS 102 is coupled to PDG and/or PLT sensors at or near one or more production zones of an intelligent well system equipped with inflow control valves. The received data (referred to as field data) includes measurement data and data relating to well system configurations. Such data includes, for example, current time, choke valve position, oil, gas and water rates, flow meter status, master and wing valve status, flow meter pressures and temperatures, bottomhole pressures and temperatures, and pressures and temperatures taken along a borehole (e.g., before choke pressures and temperatures, and after choke pressures and temperatures). Field data processing includes bringing the data into a format that can be used by the forward model. Then data sorting, screening and filtering processes are performed to ensure data consistency and removal of erroneous measurements prior to running the forward model.

Static data 104 and dynamic or transient (e.g., real time) data 106 are forwarded via an input module 108 to a forward simulation module 110. Simulation output 112 (e.g., flow rates, production estimates, production predictions) is output to a graphical user interface (GUI) module 114 for presentation to a user. All or any subset of the static data and/or real time data may also be output to the GUI module as requested. Additional modules access the forward model for additional processes. For example, the application includes a model calibration module 116, a probabilistic forecasting module 118, a valve optimization module 120, a production optimization module 122 and/or a control module 124.

In one embodiment, the application is configured to automatically adjust model parameters using the above-described inversion algorithm by, e.g., the calibration module 116. The model may be updated or calibrated at various times. For example, an initial model calibration is performed using historical data, which includes any measurement data generated in the borehole during pervious production operations, such as daily historical monitoring data. Thereafter, the model is automatically and periodically updated using measured values determined from surface and/or downhole sensors, e.g. single and distributed well sensor measurements. The calibration module 116 applies the inversion algorithm by receiving current model parameters, and simulating measurement data. If a deviation between the simulated data and received measurement data beyond a selected magnitude is detected, certain model parameters are adjusted to compensate for the model drift. The selected model parameters, in one embodiment, are chosen from a model constraining group, which includes parameters such as pressure, temperature and/or fluid flow rate.

The application, in one embodiment, continuously or periodically monitors the field sources, and updates or calibrates the model automatically using the inversion algorithm. Once production data is available, another model drift compensation cycle starts. If deviation is detected, one or more parameters that make up the forward model are adjusted to account for on-going well operational disturbances. The updating or calibration process may be performed in real time, i.e., as measurement data becomes available, performed according to a pre-set schedule or performed in response to a user instruction.

The calibration or adjustment process includes automatically determining or adjusting the values of a set of model parameters that result in the best matching of the simulated and measured data. Exemplary model parameters that may be adjusted include formation permeability, reservoir thickness, reservoir pressure, reservoir temperature, and reservoir fluid properties. The system provides an automatic updating and adjusting capability without requiring the availability of human intervention. The system functions in the background, updating and adjusting the model without intervention by the user so that the model continuously remains accurate as needed.

For example, the system on a pre-specified periodic basis (every five minutes, for example) determines production and formation property values using the forward model, which may be output to a user interface. Such values include one or more of multiphase flow rates, reservoir production allocation, reservoir pressure and temperature profiles, bottomhole flowing pressures and temperatures, dynamic reservoir characterization and produced water cut. The model is also continuously or periodically monitored by comparing values simulated by the forward model to a pre-specified tolerance. If simulated and measured values are in agreement within the tolerance, that is, if the current deviations are below a pre-determined threshold, the model is stored for continuous use and the updating process is suspended. However, if the simulated values are outside the tolerance, the system automatically calibrates the model by using the inverse model to adjust the forward model parameters so that acceptable agreement between simulated or calculate values and measured values is reached. When satisfactory agreement is reached, the production and formation properties may be output to a user, and the resulting numerical model may be used to make deterministic and probabilistic production forecasting until the next scheduled update time.

Figure 6:
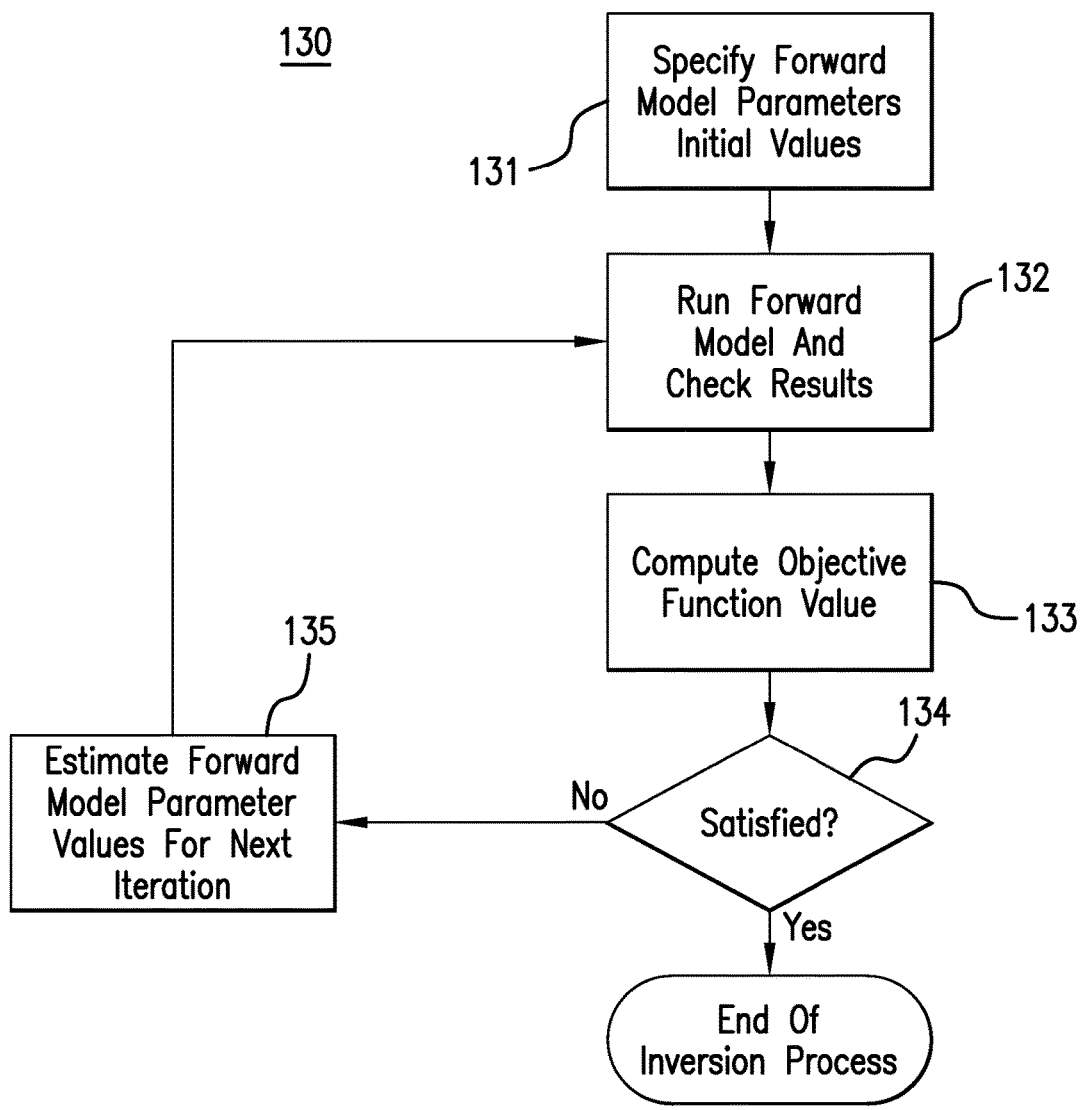
FIG. 6 is a flowchart depicting an embodiment of a model calibration and adjustment method.
Figure 7:
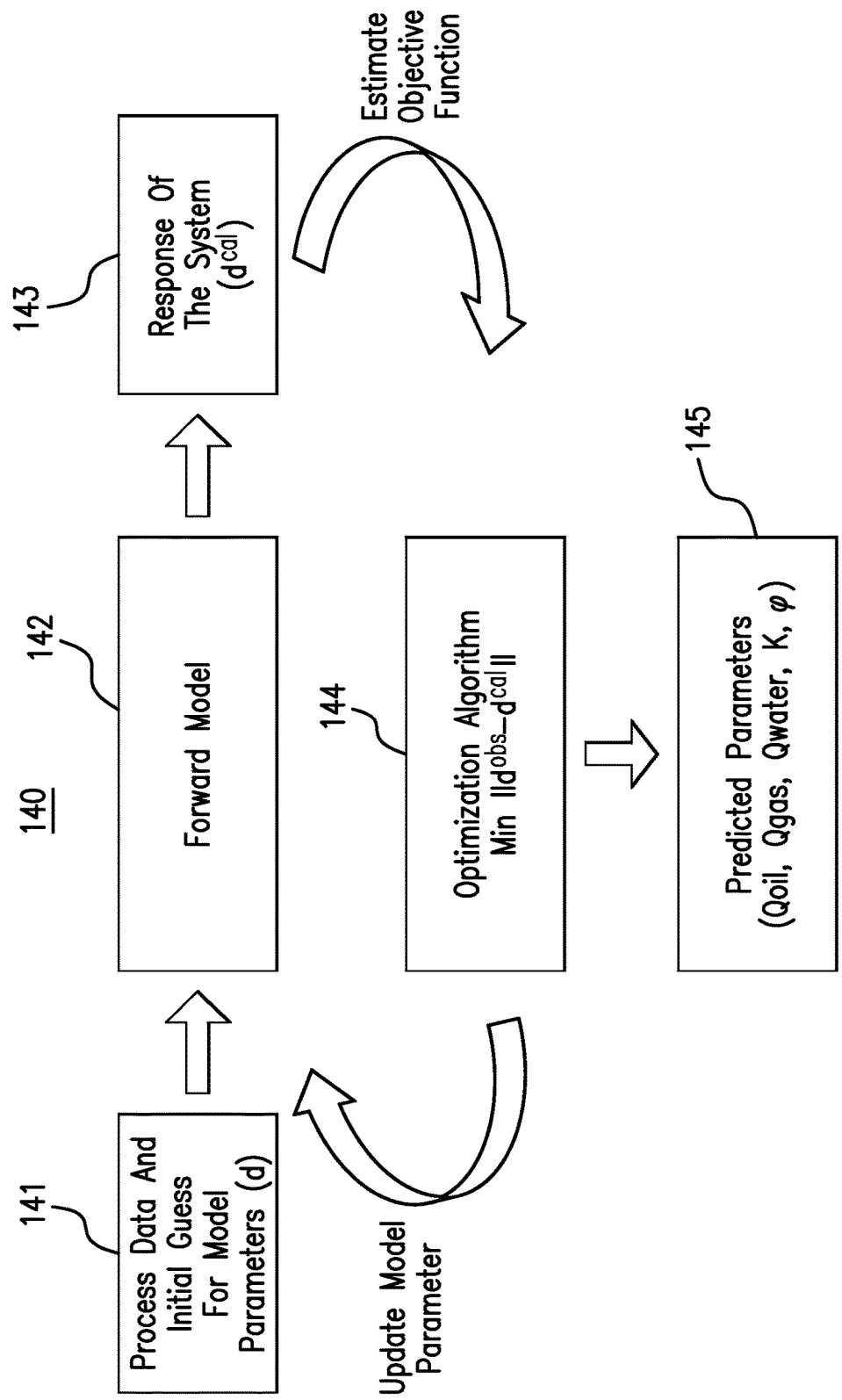
FIG. 7 depicts an embodiment of a model calibration and adjustment method.

FIGS. 6 and 7 illustrate workflows for automatic calibration and updating of the thermal reservoir model using the inversion algorithm. An embodiment of a workflow 130 includes specifying initial forward model parameter values (block 131) and forwarding them to, for example, the simulation module 80. The forward model is run using the initial values to generate calculated data, i.e., predicted values for measurement data (block 132). Measurement (field observed) data is collected and processed, and an objective function value is calculated based on differences between the calculated data and the measurement data (block 133). If the objective function value is within a selected range, e.g., within some selected minimum of the objective function or error value (block 134), the model parameters are considered to be acceptable and the calibration or update process ends. If the objective function value is not within the selected range, the forward model is run again (block 135) and a new objective function value is calculated. This process is repeated using the above-described inversion until the objective function value is minimized or within the selected range.

FIG. 7 shows another embodiment of an automatic calibration and updating process, represented by workflow 140. Initial model parameters and boundary conditions are received (block 141) and input to the forward model (block 142). An inversion algorithm is performed using the model and calculated data values ($d^{cal}$) such as pressure, temperature and/or flow rate are generated (block 143). The calculated values $d^{cal}$ are compared to observed values ($d^{obs}$) to generate a difference value (block 144). If the difference is not at or near some minimum, one or more subsequent iterations are performed by updating or adjusting one or more model parameters and repeating blocks 141-144 until the minimum is reached, and the accepted model parameters are output (block 145).

Figure 8:
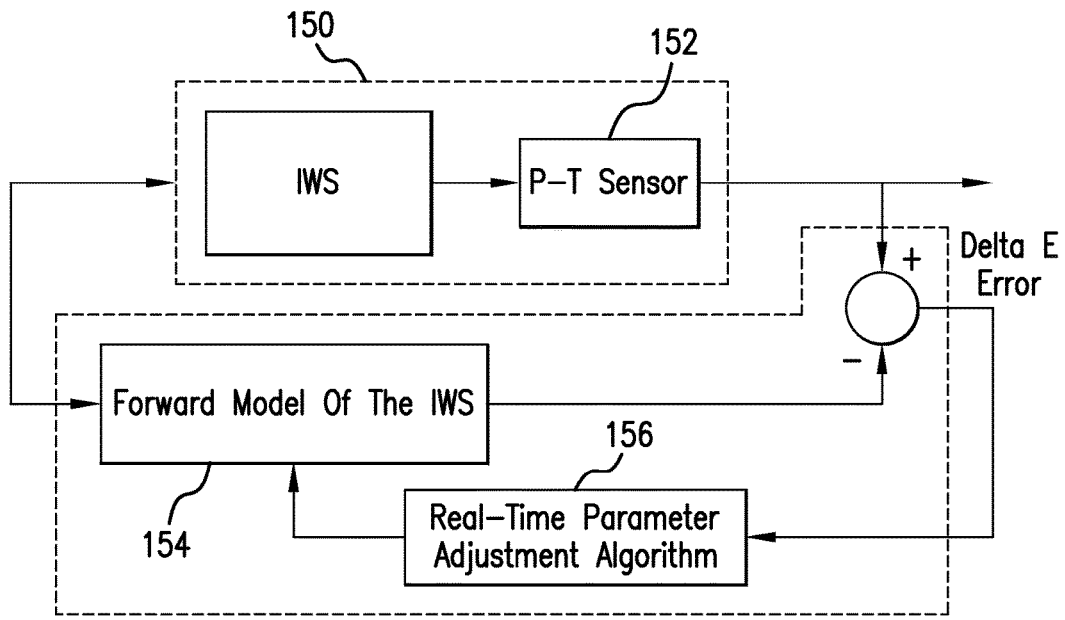
FIG. 8 illustrates an exemplary method of real time model parameter adjustment.

FIG. 8 illustrates the communication and function of the application with respect to a production system. In this example, the production system is an intelligent well system (IWS) 150 that includes pressure and temperature sensors 152 and downhole inflow control valves. Raw transient field observed data (e.g., PDG data, DTS data and/or PLT data) from the sensors 152 are output to an inversion module, which performs an inversion process using a forward model 154 to calculate expected measurement values. An error value representing the difference between the expected and observed data is output to a real time parameter adjustment module 156, which adjusts parameters of the forward model 154 automatically based on the error.

Figure 9:
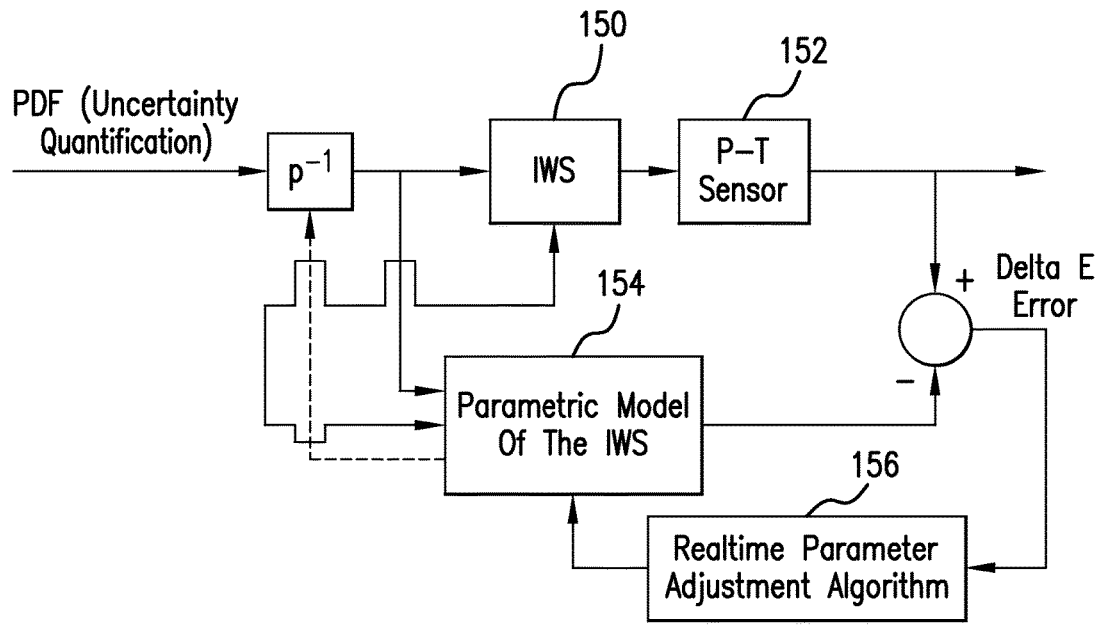
FIG. 9 depicts an exemplary method of real time model parameter adjustment that includes uncertainty quantification.

The modelling, prediction and adjustment/calibration processes described herein may incorporate uncertainties in the measurement data and/or other data used to build and adjust the forward model. FIG. 9 illustrates taking uncertainties into account when building and/or adjusting the model. In this example, an uncertainty quantification algorithm reconciles measurement data and other data points used in the model and compares the data points to expected uncertainties using data filtering algorithms. For example, the standard deviation or other error value is assigned to each data point, and this uncertainty is taken into account when building and/or updating the model.

As discussed above, the forward and inverse models may be used for automatic monitoring and calibration, as well as for prediction and forecasting of production parameters based on the model. For example, the model is applied to generate a deterministic forecast using a single scenario or a probabilistic forecast that assesses multiple scenarios.

In one embodiment, predictions or forecasts are generated that provide probabilistic multiphase rates and/or zonal allocation estimation based on multiple initial conditions or scenarios. The scenarios may be generated by adding perturbation to initial data in the forecasting process to produce multiple initial states for the forward model. Uncertainty is included in the observation, the analysis and the post processing performed during generation of forecasts.

Figure 10:
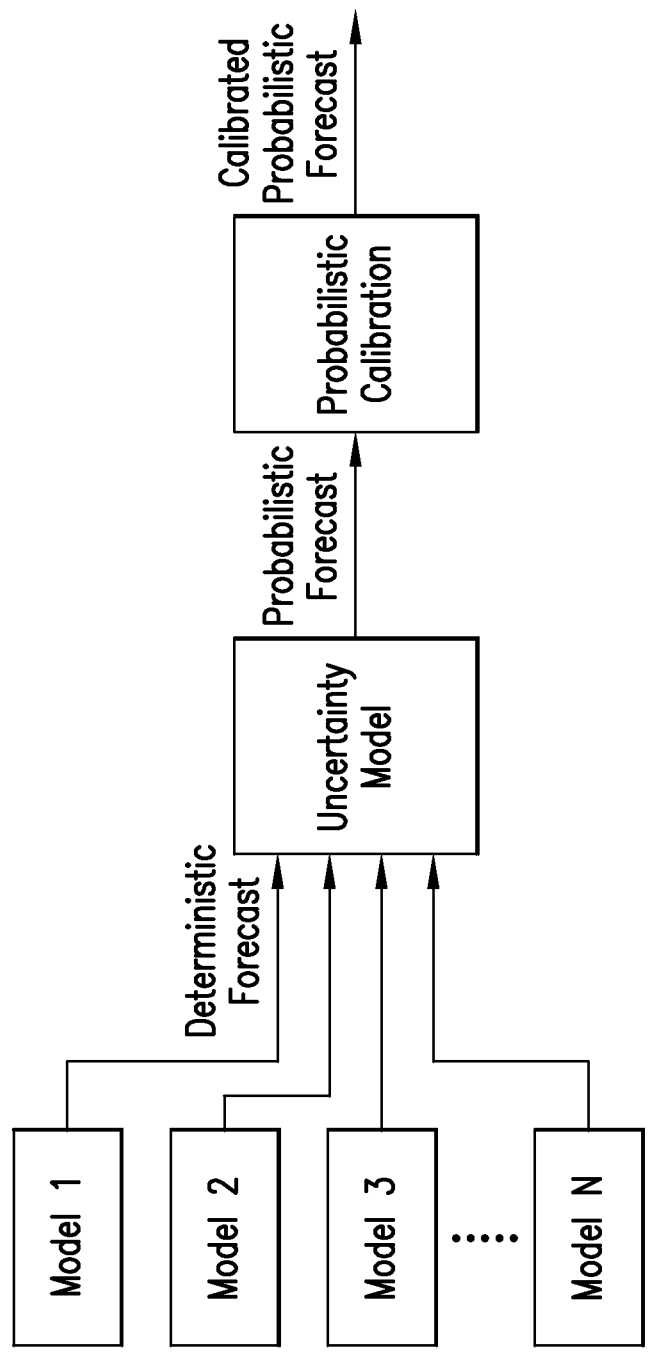
FIG. 10 depicts an embodiment of a method of probabilistic production forecasting.

FIG. 10 shows an example of a probabilistic forecasting process. In this example, the application generates a plurality of model scenarios. Each scenario represents a different estimate of conditions, such as rate and/or composition of injection fluid and downhole vale settings. The application forwards the output from each model simulation (e.g., multi-phase flow rates and production rates) to an uncertainty model, such as a Markov Chain Monte Carlos-based uncertainty quantification model. Based on the results of the uncertainty model, a probabilistic forecast is generated that indicates the probability of specific flow rates in response to the scenarios. This forecast may be calibrated or adjusted using received measurement data as discussed above. In addition, the forecasting process can be used to optimize various production parameters, such as injection rates, injection fluid types, flow rates and valve settings.

Figure 11:
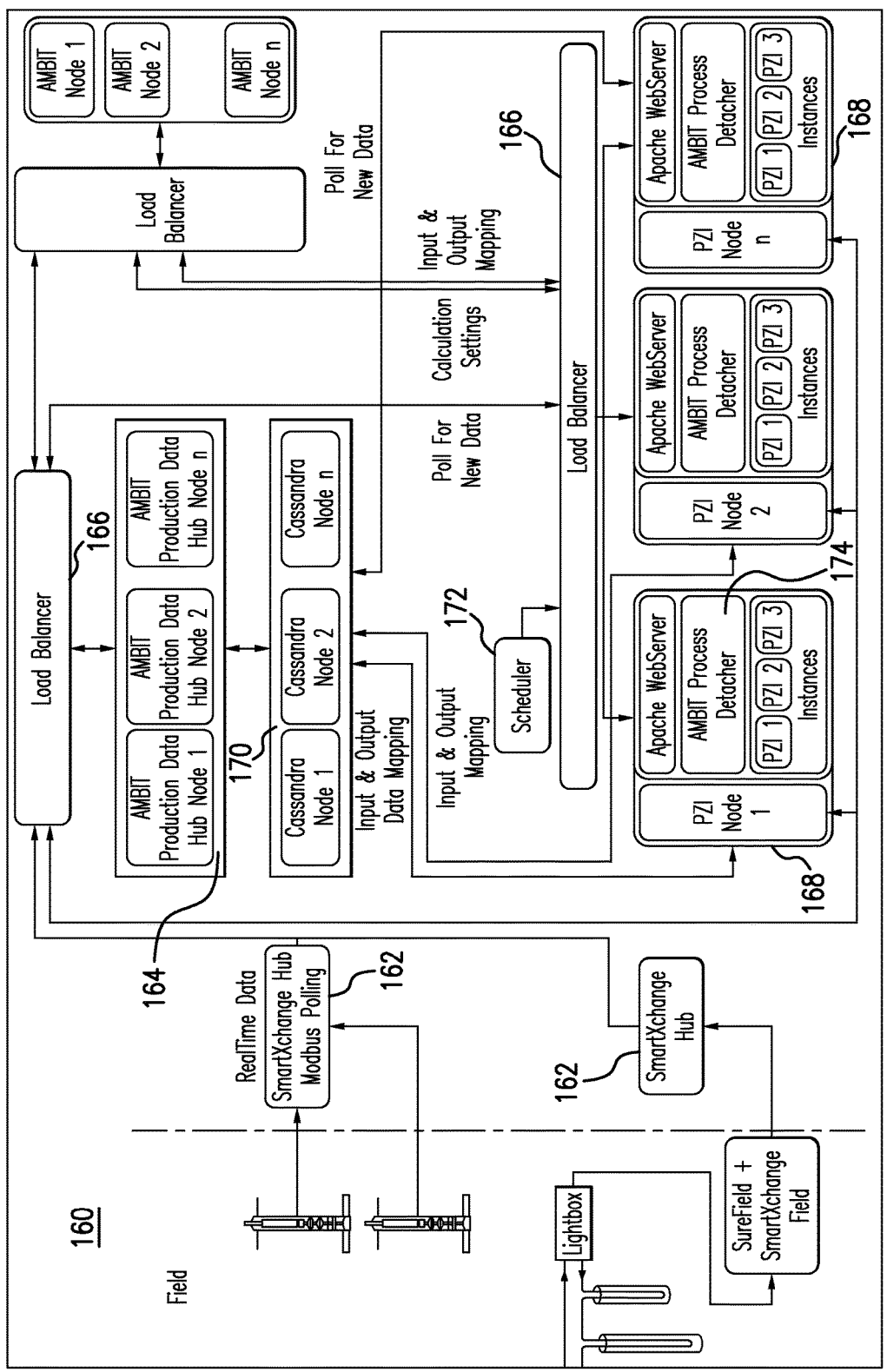
FIG. 11 illustrates an embodiment of a system for performing functions such as modeling, calibration, and forecasting.

FIG. 11 illustrates an embodiment of an integrated system 160 including hardware components, software modules, and solution sets that can be employed to perform the modeling, calibration, forecasting and other functions described herein. The integrated system gives users the capability to perform calculations with real-time data for quick decision making, as well as the capability to generate production forecasts.

In one embodiment, the system 160 is a web-based system that includes web servers or other network devices that allow the application to remotely monitor field sources, and also allows user to access field source data and the forward model from remote locations.

The system 160 includes one or more field data aggregator hubs 162 that aggregate real time measurement data from multiple input devices (e.g., Modbus, OPC-UA, Light box devices) and processes the data into a data format (e.g., industry standard PRODML format) used by the application. The processed measurement data is stored in a production data hub 164 for the consuming application. This real-time interoperability with remote visibility enables decision making to be located in a centralized location and allows for data to be made available over the internet into a secured platform. Transforming the result into the PRODML format (or other data format) enables other consuming applications to take inputs from the data hub 164 and provides easy integration to existing infrastructure.

One or more dispatchers (or load balancers) 166 control transmission of data between client nodes 168, the data hub 164 and databases 170. Based on the frequency of real time data received from field sources, a scheduler 172 invokes a process detacher 174, which grabs data from the data hub 164 for a particular well or group of wells. Based on configuration parameters, each channel involved in modeling, simulation and/or forecasting calculations get filtered, and the filtered channels and their values are mapped as a suitable data structure. The data structure described herein is in the form of a CSV file, but is not so limited. The CSV file is supplied to the application (shown herein as an instance in a client node) along with another file which contains the well static parameters and models. The static parameters and models may be different for each well or group of wells based on, e.g., well type.

The application performs calculations and writes the results in another CSV file (e.g., production rates, forecasts, etc.) that can be stored in a specific folder. The calculated results are read by a dispatcher 166 and the production data hub 164 is updated accordingly. The calculated results and other pertinent information are output to a user interface in the form of graphs, charts, reports or other structures. For example, the user interface may display key performance indicators and information in one or more dashboard displays.

Using the data interpretation from the application, users can have supervisory control of field assets and keep active control of the operations. In addition, results can be used to trigger exceptions using alarm management capabilities embedded in the solutions. These exceptions can be in any form, e.g., as emails, sound or visual indicators based on user preference, and can be turned on or off. Such alarm management capabilities allow for trigger exceptions to be set based on user preference (e.g., email, SMS, sound or visual based alarms).

Figure 12:
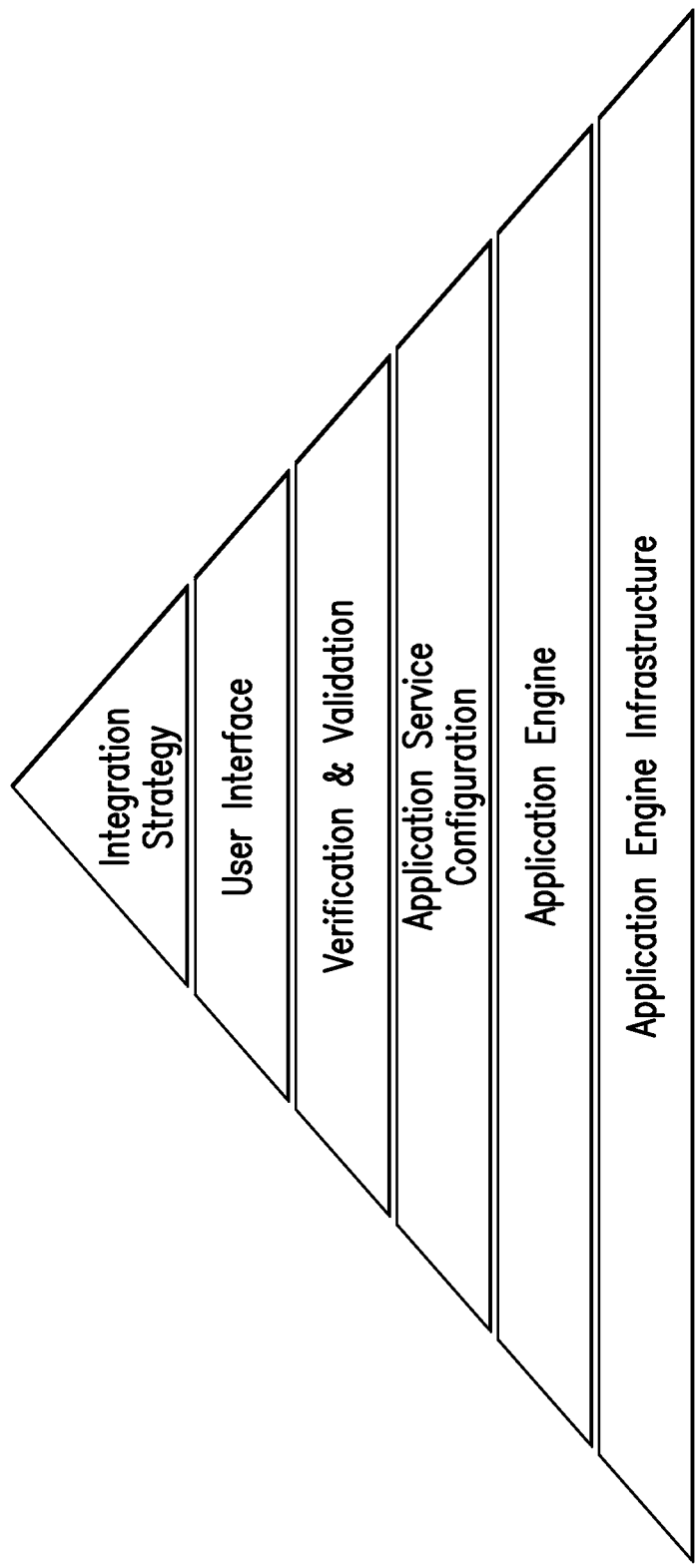
FIG. 12 depicts a layered framework employed by the system of FIG. 11.

In one embodiment, the system is supported by a layered framework, which is illustrated in FIG. 12. The framework includes six layers: an integration strategy layer, a graphical user interface (design) layer, a verification and validation layer, an application service configuration layer, an application engine layer and an application engine infrastructure layer.

The application verification and validation layer provides methodology for testing the system with historical and live data sources. The application retrieves data from a data source such as a production or energy industry database, which manages and stores production operational data of wells that may be in multiple geographical locations in the world. Usually, the data source provides static and real-time data of many production parameters of a particular well. The user of the system can choose the required parameters for dynamic data driven simulation and optimization analysis. At the system service configuration layer, application services are configured and implemented for both online and offline operating modes. The individual services are created by exposing the functionalities of the system as web service operations.

The application engine layer provides a computational engine for the system simulation and optimization services. The system employs the dynamic data driven modelling and simulation framework described above. The infrastructure layer provides an executing environment for the system and other services and tools. In one embodiment, the infrastructure layer includes a network-based infrastructure that allows for local and remote (e.g., web-based) access to data and the application. An exemplary infrastructure is the AMBIT™ platform by Baker Hughes, Inc. Such platform may provide capabilities such as multi-tenancy, management and security capabilities.

The graphical user interface (GUI) is the representation layer of the system engine and service configuration. It provides intuitive ways for users to interact with the various system capabilities, including an easy-to-use interface and real-time simulation results rendering. The GUI provides a user interface that allows for interaction with displayed data and control of which data to display and in what form, e.g., with windows point and click, for measured and simulated data visualization The GUI includes, in one embodiment, a dynamic dashboard display that provides real time and/or historical performance statuses, as well as modelling results, forecasts, model parameter data and data collected from field sources. Information that can be displayed includes mass and volume rates for each phase, temperature and pressure at each valve and/or production zone, illustrations or descriptions of wells and well properties, and valve locations and properties (e.g., valve position, pressure, temperature, manifold temperature, manifold pressure). The GUI may include information for individual wells, and provide alarm indications (e.g., color coded green, red, yellow indicators). The dynamic dashboard, in one embodiment, displays results, data and other information relating to formation and/or production properties, immediately and/or in real time or otherwise as such information changes. The dynamic dashboard may display any information useful to a user or operator, such as trending data, profiling data, key performance indicators and grid views. Information displayed by the dynamic dashboard may be viewed from anywhere using any standard browser (IE, Firefox, Chrome, Safari, etc.).

Performance analysis information can also be displayed, such as production rates over time, oil rates, gas rates, water rates, contribution to production of phases by individual perforation zones, relative error and error distributions, cumulative production. For example, trend plots and production profile plots for real-time historical data and calculation values are displayed, which may be fully editable and can be saved in plot collections.

Other information includes SCADA/PI configuration screens for real-time data details (tags, units, conversions, min/max limits, overrides, etc.), configuration screens for model configuration data such as model parameters, logging parameters, and user management settings. Still further information includes system status screens for showing the status of all system components and component logs, forecasts of single well and cluster well performance, automatic tracking of the remaining oil and gas reserves.

In one embodiment, the system provides an enterprise asset navigation hierarchy to manage and monitor an asset or assets (e.g., production fields and wells) and monitor their status at different levels. This hierarchy includes, in order of scope: enterprise, region/country, field, well/bore, and processing system levels. The enterprise, region and field levels include, e.g., a units deployed summary, a map overview with health statuses, location, well names and other information. A user is able to navigate to a particular well through the map to view the system information for that well. A user navigating the GUI is able to manage/monitor facility information for a well or group of wells, control parameters, static parameters, and generate snap shots of system trends or profiles at user specified times and a dashboard overview of well performance and time trend curves in a user specified time span.

The following is a description of particular examples of system operation to perform model creation, updating, calibration, forecasting and monitoring. These examples describe particular files and filenames that represent received data, simulation results and other information. The particular data formats and file names are provided for illustration and are not meant to be limiting. These exemplary operations can be performed using the system 10 and/or 160, or any other suitable system that allows for access to field data and processing capabilities described herein.

A process for running or executing the forward model begins by specifying input quantities in a file 'input.txt', which includes information on the dimensions of the model domain, the grid, the initial conditions, boundary conditions (constant or time-dependent), source/sink locations, output selections, and information specifying which variables at which locations and times to write to output files. A second small input file 'ed_input' contains information needed if the thermal reservoir simulator is being coupled to a second code, such as a matrix acidizing model.

A third input file, 'inv.data' indicates whether the model is being used as a forward model (e.g., for predictions and forecasts) or whether the model is being used for an inverse simulation. For forward simulations, the flag is set to 1, and nothing else in the file is used. For these simulations, the time step may be fixed (e.g., at 3 minutes) as the time interval between data points. The model can use either fixed time steps, or it can determine the next time step size on its own, based for example on the Courant limit and the number of iterations required on a previous time step.

A utility code called 'pullout-OGW.f' is used to extract particular information for a well from a database (Z35_BHI_IM-DA_Testing_Data.csv) and from the file 'PDG_wells_info.csv'. This utility code then reads template files 'input.txt.tpl.pre.template', and 'tracri.data.template', and fills in information such as porosity, formation pressure and temperature, and writes 'input.txt' and 'inv.data' files, as well as a file containing well pressure and temperature vs time, to use as an inner boundary condition.

The model is run and output parameters are generated and written to files for post-processing. Output parameters include, for example, pressure, temperature, saturations, and concentrations vs position at selected times. Boundary fluxes are also tracked at the time steps. Additional output files include information about convergence behavior and time step size at each time step. During predictive or forecasting simulations, output parameters such as oil, gas and water flows vs time (for PDGs) and/or depth (for PLTs) are written to a file called 'oil-gas-flux-v-time'. The output parameters are combined with the measured data by a code called 'collate.f' and written to a file named 'Z35_wellname_new.csv'.

For inverse simulations, all of the input for a forward simulation plus additional information controlling the inversion process is included in the file 'inv.data'. For inverse simulations, the flag in 'inv.data' is set to 2, and additional information in that file is entered by 'pullout-OGW.f', such as files containing data to compare against (e.g., oil and gas flow rates for PDG cases, flow rates and pressures and temperatures vs depth for each producing layer). The 'pullout-OGW.f' code reads data from 'PDG_wells_info.csv' and 'Z35_BHI_IM-DA_Testing_data.csv' for PDG wells and from the file 'pick_well.txf'. The 'pick_well.txt' file includes information about which well to use (for PDG cases), and what time interval to use in the data file. For PLT wells, the utility code 'readPLT.f' pulls out needed information from the file 'PLT_wellname_RAW.csv' for the PLT wells. Different utilities may be written because of the different formats or data sets provided for PLT vs PDG wells.

The inverse simulation generates all of the output for a forward simulation, plus a file called 'out-fit', which contains a running summary of performance of the inverse algorithm at each iteration, plus a listing of computed vs observed data values. The final 'input.txt' file from an inverse simulation is copied to 'input.txt.pre.template' to be used in predictive or forecasting simulations. An additional output file for PLT cases is 'inverse-summaryoutput', which lists depths, pressure, temperature and flow rates for each layer or sublayer in a PLT well. Some merging of these various files could be done to reduce the number of utility codes needed for the different well types.

An exemplary workflow for interpreting data from permanent downhole gages (PDGs) include all or some of the following steps:
1. Provide data for the PDG wells in file Z35_BHI_IM-DA_Testing_Data.csv;
2. Pull out data for each well via utility 'read_Z35.f', which creates files called 'Z35_wellname out' for each well;
3. Read additional information about wells provided in PDG_wells_info.csv (e.g., depths to top of perforated zones and sensor locations, shut-in pressure, formation temperature, fluid API and density, measured permeability, porosity and GOR);
4. The utility code 'pullout-OGW.f' creates 'input.txt.tpl' and 'inv.data' files from the results of steps 2 and 3;
5. Run simulator inv_for.exe in inverse mode;
6. Copy 'input.txt' file left at end of step 4 to 'input.txt.pre.template';
7. Set parameters in 'pick_well.txt' to predictive or forecast mode;
8. Run 'pullout-OGW.f' (after compiling);
9. Run inv_for.exe (either predictive mode or forecasting mode); and
10. Copy output file 'oil-gas-flux-v-time' to 'oil-gas-flux-v-time-pre' and copy to 'summary-files' directory.

A more detailed description of forward and/or inverse model implementation for interpreting PDG data is as follows and includes all or some of the following steps:
1. Initialize by opening files, call READDATA, and read file 'tracri.data'. If inverse simulation, read in data to be matched, specify inversion parameters, such as permeabilities and other properties. Then create 'input.txt' by filling in parameter values in appropriate locations in file 'input.txt.tpl';
2. For inverse simulation, perturb each parameter, write updated 'input.txt' file, compute forward solution for perturbed parameter set, use results to form numerical derivatives of data with respect to specified parameters, compute numerical derivatives and form approximation to Hessian, update parameters, compute goodness of fit, and stop when there is no further improvement in the solution;
3. For all forward thermal reservoir simulation process, read problem specifications from file 'input.txt'. Exemplary problem specifications include problem geometry (1-D, 2-D or 3-D, Cartesian or cylindrical coordinates), grid setup, boundary conditions, phases, initial conditions, source/sink specs, component species, and/or material properties (e.g., porosity, permeability, thermal properties, chemical properties);
4. From the grid structure and determine connectivity of sparse matrices that will arise in solutions for pressures, component species and temperature;
5. Call subroutine for identifying form of the sparse matrix depending on ordering for sparse matrix (e.g., natural, black and white, etc.);
6. Update boundary conditions;
7. Calculate pressures, compute relative permeabilities, solve sparse matrix using incomplete factorization, update new pressures, iterate until convergence is achieved, and perform implicit numerical discretization;
8. Compute new velocities for each phase at each cell face;
9. If component species are specified, discretize transport species and determine chemical reactions;
10. Compute energy transport. Compute effective thermal conductivities in each grid cell, specify energy sources/sinks and energy from reactions, compute enthalpy fluxes, form Jacobian, get temperature updates and update temperature, and iterate if needed;
11. Update time step, e.g., based on Courant limit and number of iterations required for pressure iteration. If the number of iterations exceeds a user specified value, then reduce the time step. If the number of iterations is less than specified value, then increase the time step. This process provides time scales that are short enough for predictions to be useful;
12. Compute boundary fluxes;
13. Check for output, and deliver output (e.g., 1-D, 2-D and/or 3-D snapshots of specified variables) to storage, to a printer, and/or to the GUI;

14. Check for whether the time step is the end time. If the current time is greater than the end time, the process is done; if not, go to a next time step and repeat; and
15. If inverse simulation, pull out model variables that correspond to data and return to inverse routine iteration.

An exemplary workflow for interpreting data from production logging tools (PLTs) is as follows and includes all or some of the following steps:
1. Run readPLT.f code that reads a data file, such as 'PLT_MN0085_RAW_win.csv' and pulls out information on pressure and/or temperature at the top and bottom of each producing layer, as well as the depths of the top and bottom of each producing layer;
2. Specify in the file 'input.txt.tpl', the geometry and properties of the domain. The inversion module reads this file and generates a new 'input.txt' file after each inverse iteration. Data will indicate if sub-layering would be advisable for any producing layer. For example, a distinct change in slope of the temperature profile across a layer could be a trigger for sub-layering;
 3. The 'inv.data' file indicates which variables in 'input.txt' are to be updated. The 'inv.data' file also contains information as to the initial guess for each unknown parameter (such as layer permeability and water-oil ratio), the number of iterations, and interval widths for each unknown parameter over which to search. 'inv.data' also contains the data to be used for inversion. For PLT cases, this is the pressure and/or temperature in the borehole as well as any oil and water flow data for the layers and/or for the well as a whole;
4. Pressure, temperature and/or flow rate values in the well are used to constrain flow rates through mass and energy balance calculations. Flow in the borehole at the top of a producing layer equals flow coming in the well from below the bottom of the producing layer plus flow coming in from the producing unit; the same balance is applied to energy transport. These two balance equations for each producing layer plus a reservoir model flow and transport simulation allow determination of the flow rates for oil and water in each producing layer;
4. Run inv_for.exe;
5. Write calibrated permeabilities and water-oil ratios to file 'inverse-summaryoutput';
6. Using 'readPLT.exe', combine 'inverse-summary-output' with data and well information from 'PLT_wellname.csv' to produce a final summary file, e.g., a spreadsheet file; and
7. With the calibrated model, carry out predictive or forecasting simulations if desired.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing aspects of the teachings herein. For example, a sample line, sample storage, sample chamber, sample exhaust, pump, piston, power supply (e.g., at least one of a generator, a remote supply and a battery), vacuum supply, pressure supply, refrigeration (i.e., cooling) unit or supply, heating component, motive force (such as a translational force, propulsional force or a rotational force), magnet, electromagnet, sensor, electrode, transmitter, receiver, transceiver, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:
1. A method for online real-time modeling, estimation and forecasting of production performance properties of one or more hydrocarbon production operations, the method comprising:
receiving, by a data aggregation module, real-time field data from a field source at a processor that stores and displays information, the field data including at least one of operational parameters and measurements taken by one or more downhole sensors during the one or more production operations;
estimating, by a modelling module, formation properties and production performance properties associated with the field source by applying the field data to a two or three-dimensional numerical transient thermal multiphase reservoir flow model; and
automatically calibrating the numerical transient thermal multiphase reservoir flow model by a calibration module, wherein calibrating includes:
selecting calibration parameters corresponding to values of selected model parameters, and applying the calibration parameters to the reservoir flow model to generate a solution that includes predicted properties that correlate with the selected model parameters, the predicted properties including at least one of flow rates and formation properties;
in response to receiving real time measurement data from the field source, automatically calculating a difference between the predicted properties and measured properties obtained from the real time measurement data that correlate with the selected model parameters, and calculating an objective function value based on the difference;

performing, by an inversion module, an inversion that includes iteratively adjusting the selected model parameters until the objective function reaches a selected minimum value; and automatically updating the transient thermal multiphase reservoir flow model by the inversion module, by applying the selected model parameters associated with the minimum objective function value; and using the automatically calibrated transient thermal multiphase reservoir flow model to forecast at least one of: short-term reservoir parameters, long-term reservoir parameters, near-wellbore reservoir features and production performance properties.

2. The method of claim 1, further comprising, prior to calibrating, comparing a value of one or more of the estimated formation properties and production properties to a pre-selected tolerance, wherein the calibrating is performed only if the value is outside of the tolerance.

3. The method of claim 1, wherein the field source includes a plurality of producing zones, and the formation properties and production properties are estimated for each zone.

4. The method of claim 1, wherein the field source includes a plurality of production boreholes, and receiving the field data includes receiving individual field data from each of the plurality of field sources and transforming the individual field data into a single data format for use in estimating the formation properties and the production properties, wherein estimating includes generating a separate model for one or more of the plurality of production boreholes, and calibrating is performed at least substantially in real-time.

5. The method of claim 1, further comprising controlling at least one flow control device based on the forecast, to control a parameter of fluid flow in a hydrocarbon production system.

6. The method of claim 1, wherein the thermal reservoir model is a forward model that includes coupled partial differential equations derived from mass continuity equations for multi-phase production fluids and reservoir energy equations.

7. The method of claim 1, further comprising filtering the field data by comparing each data point in the field data to an expected uncertainty.

8. The method of claim 1, further comprising generating a probabilistic forecast of future production properties.

9. The method of claim 8, wherein generating the probabilistic forecast includes perturbing model parameters used to build the thermal reservoir model to produce multiple scenarios for the forward model, and inputting the multiple initial states to an uncertainty model to generate the probabilistic forecast that indicates the probability of future production properties in response to the scenarios.

10. The method of claim 1, wherein the field source includes at least one intelligent well system with single and/or multiple zones, and the one or more downhole sensors are selected from at least one of a production logging tool (PLT), a distributed temperature sensing (DTS) system, and a permanent downhole gauge (PDG).

11. A system for estimating and forecasting production properties of one or more hydrocarbon production operations, the system including:

a data aggregation module configured to communicate with a field source via a web-based network and receive field data therefrom, the field data including at least one of operational parameters and measurements taken by one or more downhole sensors;

a transformation module configured to transform field data into an industry data format for use by at least the modeling module;

a modelling module configured to automatically input the field data into a numerical transient thermal multiphase reservoir flow model available to a plurality of users, and estimate formation properties and production properties associated with the field source based on the reservoir flow model;

a calibration module configured to receive calibration parameters corresponding to values of selected model parameters, apply the calibration parameters to the reservoir flow model to generate a solution that includes predicted properties that correlate with the selected model parameters, the predicted properties including at least one of flow rates and formation properties, the calibration module configured to automatically calculate a difference between the predicted properties and measured properties obtained from the field source that correlate with the selected model parameters, and calculate an objective function value based on the difference; and an inversion module configured to perform an inversion that includes iteratively adjusting the selected model parameters until the objective function reaches a selected minimum value, and automatically update the reservoir flow model by applying the selected model parameters associated with the minimum objective function value.

12. The system of claim 11, wherein the calibration module is configured to compare a value of one or more of the estimated formation properties and production properties to a pre-selected tolerance, and apply the calibration parameters only if the value is outside of the tolerance.

13. The system of claim 11, wherein the field source includes a plurality of producing zones, and the formation properties and production properties are estimated for each zone.

14. The system of claim 11, wherein the field source includes a plurality of production zones and/or boreholes, and the data aggregation module is configured to receive individual field data from each of the plurality of field sources and transform the individual field data into a single data format for use in estimating the formation properties and the production properties.

15. The system of claim 14, wherein the modelling module is configured to generate a separate model for one or more of the plurality of production zones and/or boreholes and calibrating the production zones and boreholes for the seperate flow model.

16. The system of claim 11, wherein the thermal reservoir model is a forward model that includes coupled partial differential equations derived from mass continuity equations for multi-phase production fluids and reservoir energy equations.

17. The system of claim 11, wherein the data aggregation module is configured to filter the field data by comparing each data point in the field data to an expected uncertainty.

18. The system of claim 11, wherein the modelling module is configured to generate a probabilistic forecast of future production properties.

19. The system of claim 18, wherein the probabilistic forecast is generated by perturbing model parameters used to build the thermal reservoir model to produce multiple scenarios for the forward model, and inputting the multiple initial states to an uncertainty model to generate the probabilistic forecast that indicates the probability of future production properties in response to the scenarios.

20. The system of claim 11, wherein the field source includes at least one intelligent well system with multiple production zones, and the one or more downhole sensors are selected from at least one of a production logging tool (PLT), a distributed temperature sensing (DTS) system, and a permanent downhole gauge (PDG).

21. The system of claim 11, further comprising a series of functional interfaces selected from at least one of: data downloading and uploading utilities, and instructions for executing calibration processes.

22. The system of claim 11, further comprising a web based service for viewing data using a plurality of types of web browsers.

23. The system of claim 11, further comprising alarm management capabilities to trigger exceptions based on user preference.

24. The system of claim 11, further comprising a dynamic dashboard configured to display data relating to formation and/or production properties.

25. The system of claim 11, wherein the selected parameters are chosen from a model constraining group including at least one of pressure, temperature, and fluid flow rate properties.

26. The system of claim 11, wherein the data format is an industry standard PRODML format.

\* \* \* \* \*